United States Patent
Takahashi et al.

(10) Patent No.: US 7,567,534 B2
(45) Date of Patent: Jul. 28, 2009

(54) MOBILE HOST, PAGING AGENT, PACKET COMMUNICATION SYSTEM, AND MOVEMENT DETECTION METHOD

(75) Inventors: Hideaki Takahashi, Yokohama (JP); Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 743 days.

(21) Appl. No.: 11/107,918

(22) Filed: Apr. 18, 2005

(65) Prior Publication Data

US 2005/0249131 A1      Nov. 10, 2005

(30) Foreign Application Priority Data

Apr. 20, 2004 (JP) .............................. 2004-124589

(51) Int. Cl.
*H04W 4/00* (2009.01)
(52) U.S. Cl. ........................ 370/331; 370/338; 370/469; 455/456.6
(58) Field of Classification Search ................. 370/331, 370/338, 469; 455/456.6
See application file for complete search history.

(56) References Cited

U.S. PATENT DOCUMENTS

| | | | |
|---|---|---|---|
| 6,930,988 B2 * | 8/2005 | Koodli et al. ............... | 370/331 |
| 7,283,496 B2 * | 10/2007 | Gurivireddy et al. ........ | 370/331 |
| 2001/0046223 A1 | 11/2001 | Malki et al. | |
| 2003/0087646 A1 | 5/2003 | Funato et al. | |
| 2003/0225887 A1 | 12/2003 | Purnadi et al. | |
| 2004/0203596 A1 * | 10/2004 | Sreemanthula et al. ...... | 455/411 |
| 2005/0036510 A1 * | 2/2005 | Sarikaya et al. ............. | 370/469 |

FOREIGN PATENT DOCUMENTS

| | | |
|---|---|---|
| EP | 1 432 208 A2 | 6/2004 |
| EP | A 1 432 208 | 6/2004 |
| JP | 2003-274436 | 9/2003 |
| WO | WO 01/76286 A | 10/2001 |
| WO | WO 2004/021728 A2 | 3/2004 |

OTHER PUBLICATIONS

Faccin, Dormant mode Handover support in Mobile networks, May 2002, pp. 1-5.*

(Continued)

*Primary Examiner*—William Trost, IV
*Assistant Examiner*—Toan D Nguyen
(74) *Attorney, Agent, or Firm*—Oblon, Spivak, McClelland, Maier & Neustadt, P.C.

(57) ABSTRACT

A mobile host 2 as an embodiment of the invention comprises a data link layer connection establishment notification unit 202 for notifying the network layer that a connection to a link layer in the data link has been established during a Dormant state; a router information requesting unit 203 for transmitting, in response to the notification by the data link layer connection establishment notification unit 202, a router request signal which requests for transmission of router advertisement information to the access router 3 existing on the access link 4 to which the mobile host is connected; and a network layer movement detection unit 204 for detecting a default router, based on the router advertisement information returned from the access router 3 in response to the router request signal.

7 Claims, 20 Drawing Sheets

OTHER PUBLICATIONS

C. Perkins, "IP Mobility Support for IPv4", Request For Comments 3344, IETF, Aug. 2002, 65 pages.

Masahiro Inoue, et al., "IP Paging Protocol for IP-based Mobile Communications System", Institute of Electronics, Information and Communication Engineers, Communication Society Conference, Sep. 2003, p. 504 (with English translation).

S. Deering, "ICMP Router Discovery Messages", Request for Comments 1256, IETF, Sep. 1991, 13 pages.

T. Narten, et al., "Neighbor Discovery for IP Version 6 (IPv6)", Request for Comments 2461, IETF, Dec. 1998, 59 pages.

D. Johnson, et al., "Mobility Support in IPv6", draft-ietf-mobileip-ipv6-24.txt,IETF, RFC3775, Jun. 2004, pp. 1-120.

Stefano M. Faccin, et al., "Dormant mode Handover Support in Mobile Networks", IETF Standard-Working-Draft. Internet Engineering Task Force, IETF, CH., No. 1, XP-015031155, Nov. 2001, pp. 1-31.

* cited by examiner

*Fig.9*

| | | | | | ACCESS ROUTER INFORMATION | | | | |
|---|---|---|---|---|---|---|---|---|---|
| Sequence | Cur Hop Limit | M | O | Router Lifetime | Reachable Time | Retrance Timer | AR Address | Link-layer Address | MTU |
| .. | .. | .. | .. | .. | .. | .. | .. | .. | .. |
| Seq#1 | 64 | 0 | 0 | 3600 | 30000 | 1000 | fe80::202:xxxx:yyyy:zz1 | aa:bb:cc:dd:ee:f1 | 1500 |
| Seq#2 | 64 | 0 | 1 | 7200 | 30000 | 1000 | fe80::202:xxxx:yyyy:zz2 | aa:bb:cc:dd:ee:f2 | 1500 |
| .. | .. | .. | .. | .. | .. | .. | .. | .. | .. |

| | | | ACCESS ROUTER INFORMATION | | | ACCESS POINT INFORMATION |
|---|---|---|---|---|---|---|
| Prefix Length | L | A | Router Lifetime | Valid Lifetime | Preferred Lifetime | Prefix | Link-layer Address |
| .. | .. | .. | .. | .. | .. | .. | .. |
| 64 | 1 | 1 | 3600 | 3600 | 3600 | 2000:y1:x1::/64 | .. |
| 64 | 0 | 1 | 7200 | 3600 | 3600 | 2000:y1:x2::/64 | .. |
| .. | .. | .. | .. | .. | .. | .. | .. |

*Fig.11*

| PAGING AREA NUMBER | PAGING AREA SUBNET | AFTER-MOVEMENT SUBNET |
|---|---|---|
| ⋮ | ⋮ | ⋮ |
| 1 | 2000:y1:x1::/64<br>2000:y2:x2::/64<br>2000:y3:x1::/64<br>2000:y4:x1::/64<br>2000:y5:x1::/64 | 2000:y1:x2::/64<br>2000:y2:x1::/64 |
| 2 | 2000:y1:x2::/64<br>2000:y7:x1::/64<br>2000:y6:x1::/64 | 2000:y4:x1::/64<br>2000:y5:x1::/64<br>2000:y3:x1::/64<br>2000:y2:x1::/64<br>2000:z2:x2::/64 |
| 3 | 2000:z1:x1::/64<br>2000:y2:x1::/64<br>2000:y9:x2::/64<br>2000:z2:x2::/64 | 2000:y5:x1::/64<br>2000:y6:x1::/64<br>2000:y2:x2::/64<br>2000:y7:x1::/64 |
| ⋮ | ⋮ | ⋮ |

Fig.18

| Sequence | Cur Hop Limit | M | O | Router Lifetime | Reachable Time | Retrance Timer | AR Address | Link-layer Address | MTU |
|---|---|---|---|---|---|---|---|---|---|
| .. | .. | .. | .. | .. | .. | .. | .. | .. | .. |
| Seq#1 | 64 | 0 | 0 | 3600 | 30000 | 1000 | fe80::202:xxxx:yyyy:zz1 | aa:bb:cc:dd:ee:f1 | 1500 |
| Seq#2 | 64 | 0 | 1 | 7200 | 30000 | 1000 | fe80::202:xxxx:yyyy:zz2 | aa:bb:cc:dd:ee:f2 | 1500 |
| .. | .. | .. | .. | .. | .. | .. | .. | .. | .. |

ACCESS ROUTER INFORMATION

| Prefix Length | L | A | Router Lifetime | Valid Lifetime | Preferred Lifetime | Prefix |
|---|---|---|---|---|---|---|
| .. | .. | .. | .. | .. | .. | .. |
| 64 | 1 | 1 | 3600 | 3600 | 3600 | 2000:y1:x1::/64 |
| 64 | 0 | 1 | 7200 | 3600 | 3600 | 2000:y1:x2::/64 |
| .. | .. | .. | .. | .. | .. | .. |

ACCESS ROUTER INFORMATION

| Prefix | Link-layer Address |
|---|---|
| .. | .. |
| gg:bb:cc:dd:ee:f1 | |
| hh:bb:cc:dd:ee:f1 | |
| .. | .. |

ACCESS POINT INFORMATION

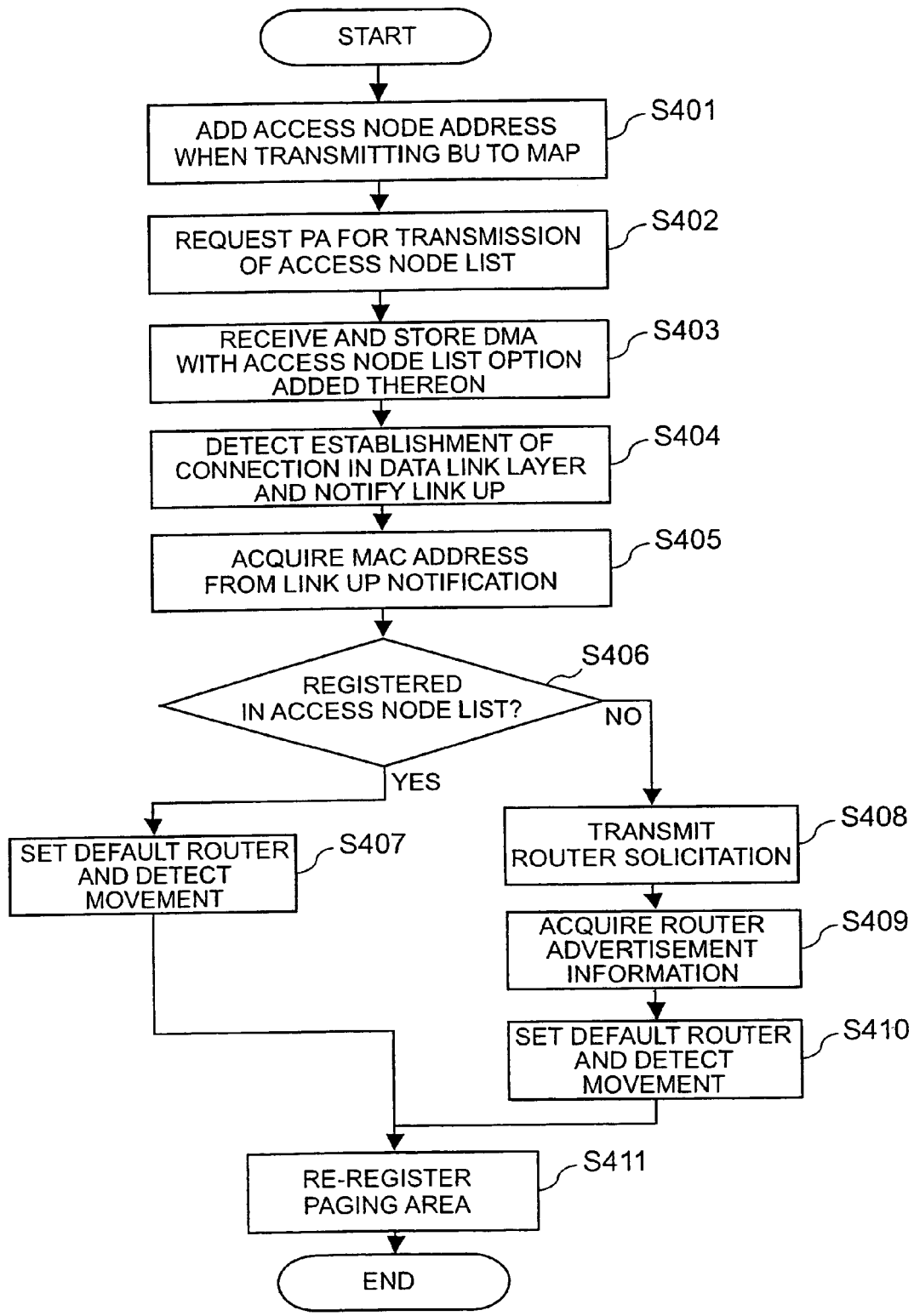

MOBILE HOST, PAGING AGENT, PACKET COMMUNICATION SYSTEM, AND MOVEMENT DETECTION METHOD

BACKGROUND OF THE INVENTION

1. Field of the Invention

The present invention relates to a mobile host, a paging agent, a packet communication system, and a movement detection method.

2. Related Background Art

Mobile IP is known as a protocol for controlling transmission and reception of packet data at a Mobile Host (MH) in a communication network (see, for example, [C. Perkins, "IP Mobility Support for IPv4", Request For Comments 3344, IETF, August 2002] and [RFC3775 "Mobility Support in IPv6", Network Working Group, June 2004]). According to the Mobile IP protocol, packet reachability from and to a node of the communication counterpart is assumed to be maintained even if MH changes the connecting link along with its movement. In addition, IPP (IP Paging Protocol) is proposed as an expansion of such a Mobile IP protocol.

With the Mobile IP protocol, an MH transmits a Binding Update (BU) to the Home Agent (HA) when changing its connecting link. The HA, managing packet transmission destinations of the MH based on the BU, transfers the communication packets, which were addressed to the MH, to the packet transmission destination thereof.

Additionally, with the IPP protocol, a method is employed which manages the MH for each paging area when the MH is not in communication in order to reduce the amount of communication traffic generated by the BU. The term "paging area" refers to a region in which a BU is not transmitted even if the mobile host moves between networks included in the paging area when the mobile host is not in communication. On the other hand, a method which expands the IPP protocol for mobile communication is proposed (see "Proposal of IP paging in an IP based mobile communication system" by Masahiro Inoue, Ichiro Okajima, Narumi Umeda, Institute of Electronics, Information and Communication Engineers, Communication Society Conference, September, 2003)

When performing movement detection in the network layer of the MH, the above-mentioned Mobile IP protocol and the IP protocol as its expansion use the router discovery protocol, which is one of internet protocol techniques (see JPA 2003-274436 bulletin; "ICMP Router Discovery Messages" by S. Deering, Request For Comments 1256, IETF, September 1991; and "Neighbor Discovery for IP version 6 (IPv6)" by T. Narten, et al., Request For Comments 2461, IETF, December 1998). In other words, the MH receives Router Advertisement information from an access router (AR) existing on the connecting link, and performs movement detection in the network layer based on whether or not the subnet prefix of the IP address of the AR included in the router advertisement information has been changed. Furthermore, when a movement is detected with the IPP protocol, it is also determined whether or not the movement is a crossover between paging areas.

SUMMARY OF THE INVENTION

However, when performing movement detection of the MH in the above-mentioned prior arts, the transmission cycle of the router advertisement information, which the access router actively transmits, is defined to be relatively long in the Internet Protocol version 4, having a maximum of 600[sec] and a minimum of 450[sec], while a similar cycle is defined in the Internet Protocol version 6 as well. Consequently, detection of movement of the MH is delayed from the actual movement when the MH is not in communication, thereby providing Binding Updates with a tendency to be delayed. Thus a delayed Binding Update may give rise to a situation wherein packet data transmitted to the MH in the meantime do not reach the MH. On the other hand, although a shortened transmission cycle of the router advertisement information may be conceivable, it may increase unnecessary packet data in the network.

Therefore, it is an object of the present invention, having been made in contemplation of the above problems, to provide a mobile host, a paging agent, a packet communication system, and a movement detection method which are capable of enhancing the reachability of packet data, by reducing the time required for detecting the movement of the mobile host.

In order to solve the above-mentioned problems, the mobile host of the present invention is characterized by comprising a communication status detection means for detecting that the communication status in the network layer is in a Dormant state; a data link layer connection establishment notification means for notifying the network layer that a connection to a link in the data link layer has been established, if a Dormant state is detected by the communication status detection means; a network layer movement detection means for detecting a default router, triggered by notification from the data link layer connection establishment notification means.

Alternatively, the movement detection method of the present invention for detecting the movement of the mobile host in a packet communication network is characterized by comprising a communication status detection step in which the mobile host detects that the communication status in the network layer is in a Dormant state; a data link layer connection establishment notification step in which the mobile host notifies the network layer that a connection to a link is established in the data link layer if it is detected that the communication status is in a Dormant state in said communication status detection step; and a network layer movement detection step in which the mobile host detects a default router, triggered by the notification from the data link layer connection establishment notification step.

According to the above mentioned mobile host and movement detection method, movement detection of the mobile host during a Dormant state can be quickly and efficiently performed because a default router existing on the link is detected in response to the link connection establishment notification from the data link layer to the network layer when a non-communicating state (Dormant state) is detected.

In addition, it is preferred that the mobile host further comprises a router information requesting means for transmitting, in response to the notification from the data link layer connection establishment notification means, a Router Solicitation which requests for transmission of router advertisement information to an access router existing on the connecting access link, and that the network layer movement detection means detects a default router, based on the router advertisement information returned from the access router in response to the Router Solicitation.

In this case, since a request for transmission of router advertisement information is made to the access link in response to the link connection establishment notification from the data link layer to the network layer, and a default router is detected based on the router advertisement information returned in response to the request, movement detection of the mobile host can be quickly and efficiently performed without changing the arrangement and/or configuration of the access router.

In addition, the mobile host of the present invention is characterized by comprising an access node notification means for notifying the information with regard to the address of access nodes existing on the access link to which the mobile host is connected, to a paging agent which manages the movement status of the mobile host; an access node list requesting means for requesting the paging agent for transmission of an access node list which is the address list of the access nodes existing on the neighboring link of the access link; an access node list acquisition means for acquiring, from the paging agent, the access node list transmitted in response to the request by the access node list requesting means; an access node address acquisition means for acquiring, from the data link layer, the data link layer address with regard to access nodes existing on the access link, triggered by the establishment of a connection to a link in the data link layer; and a network layer movement detection means for detecting a default router, based on the data link layer address acquired by the access node address acquisition means and the access node list acquired by the access node list acquisition means.

Alternatively, the movement detection method of the present invention for detecting the movement of the mobile host in a packet communication network is characterized by comprising an access node notification step in which the mobile host notifies the information with regard to the address of access nodes existing on the access link to which the mobile host is connected, to a paging agent which manages the movement status of the mobile host; an access node list requesting step in which the mobile host requests the paging agent for transmission of an access node list which is the address list of the access nodes existing on the neighboring link of the access link; an access node list acquisition step in which the mobile host acquires, from the paging agent, the access node list transmitted in response to the request made in the access node list requesting step; an access node address acquisition step in which the mobile host acquires, from the data link layer, the data link layer address with regard to access nodes existing on the access link, triggered by the establishment of a connection to a link in the data link layer; and a network layer movement detection step in which the mobile host detects a default router, based on the data link layer address acquired in the access node address acquisition step and the access node list acquired in the access node list acquisition step.

According to the above mentioned mobile host and movement detection method, the mobile host notifies, by transmitting to the paging agent, the information with regard to the address of access nodes such as an access router or an access point existing on the access link. In addition, the mobile host requests for an access node list created in the paging agent and acquires an access node list returned from paging agent in response to the request. Furthermore, if a connection to a link in the data link layer is established, the mobile host acquires, from the data link layer, a data link layer address of the access nodes on the access link, and detects a default router by searching from the access node list for an access node matching the address. In this manner, movement detection of the mobile host can be quickly performed, and control packets in the mobile host during movement detection can be reduced, thereby allowing movement detection of the mobile host to be performed more efficiently.

Furthermore, it is also preferred that the access node notification means notifies the paging agent of the information with regard to the address of access nodes existing on the access link, if the communication status has changed from an Active state to a Dormant state, or if an access node on the link located outside the paging area is detected during a Dormant state.

With the aid of the above-mentioned access node notification means, address information with regard to access nodes will be transmitted to the paging agent only when the mobile host moved out of the paging area in a Dormant state, if the communication status has changed from an Active state to a Dormant state. Thus data packets on the network can be minimized because packets to be transmitted to the paging agent for movement control, for example, can be transmitted with address information of access nodes added thereon.

Moreover, it is also preferred that the access node notification means notifies the paging agent of the network layer address and the data link layer address with regard to the access router if the access node existing on the access link is composed of an access router, and notifies the paging agent of the network layer address with regard to the access router and the data link layer address with regard to the access point if the access node existing on the access link is composed of an access router and an access point.

In this case, the IP address of the access router and the MAC address are transmitted to the paging agent from the mobile host when the access node is composed of an access router, and the IP address of the access router and the MAC address of the access point are transmitted to the paging agent from the mobile host when the access node is composed of an access router and an access point. In this manner, an access node list corresponding to the arrangement of the access link can be acquired, allowing detection of a default router regardless of the network architecture.

Moreover, it is preferred that the access node list requesting means requests the paging agent for transmission of an access node list with regard to access nodes existing in a paging area in which the mobile host is currently located and access nodes existing on the neighboring link of the paging area.

In this manner, only the address list with regard to access nodes in the paging area in which the mobile host is located and access nodes existing on the neighboring link may be acquired, allowing detection of a default router with a minimum amount of packet data.

In addition, it is also preferred that the network layer movement detection means detects a default router from the access node list acquired by the access node list acquisition means, by searching for an access node that matches the data link layer address acquired by the access node address acquisition means.

With the above-mentioned arrangement, since a default router is detected from the access node list using the data link layer address detected from the access link in the data link layer, detection of the default router can be performed efficiently without the need of transmitting and receiving control packets in the network layer application when a movement is detected.

In addition, the paging agent of the present invention for managing the movement status of the mobile host is characterized by comprising an access node acquisition means for acquiring information with regard to the address of access nodes existing on the access link to which the mobile host is connected; an access node list creating means for creating an access node list from the information acquired by the access node acquisition means; and an access node list notification means for extracting, from the access node list created by the access node list creating means, the access nodes existing in the proximity of the access link and notifying the access nodes to the mobile host.

Alternatively, the movement detection method of the present invention for detecting the movement of the mobile host in a packet communication network is characterized by comprising an access node acquisition step in which the paging agent for managing the movement status of the mobile host acquires information with regard to the address of access nodes existing on the access link to which the mobile host is connected; an access node list creating step in which the paging agent creates an access node list from the information acquired in the access node acquisition step; and an access node list notification step in which the paging agent extracts, from the access node list created in the access node list creating step, access nodes existing in the proximity of the access link and notifies the access nodes to the mobile host.

According to the above-mentioned paging agent and movement detection method, information is acquired with regard to the address of access nodes on the access link to which the mobile host is connected, then an address list of access nodes is created from the acquired information. In addition an access node in the proximity of the access link to which the mobile host is connected is extracted from the created address list and notified to the mobile host. In this manner, an address list with regard to access nodes in the proximity of the access link of the mobile host can be provided from the history information of the address of the access nodes to which the mobile host had been connected in the past. As a result, detection of a default router for the mobile host can be readily performed.

In addition, it is preferred that the access node list notification means notifies the access node list with regard to the address of access nodes existing within the paging area in which the mobile host is located and access nodes existing on the neighboring link of the paging area.

With the aid of the above-mentioned access node list notification means, the amount of data communication traffic in providing the access node list to the mobile host can be suppressed to a minimum.

Furthermore, it is also preferred that the access node acquisition means acquires, from a mobility anchor point which manages the local movement of the mobile host, information with regard to the address of access nodes existing on the access link to which the mobile host is connected. In this manner, information with regard to the access node to which the mobile host is connected can be collected and provided, even if a distributed movement control of the mobile host is performed in a plurality of mobility anchor points, for example.

In addition, the packet communication system of the present invention is characterized by comprising the above-mentioned mobile host and the paging agent.

Alternatively, the movement detection method of the present invention for detecting the movement of the mobile host in the packet communication network is characterized by comprising an access node notification step in which the mobile host notifies the information with regard to the address of access nodes existing on the access link to which the mobile host is connected, to a paging agent which manages the movement status of the mobile host; an access node acquisition step in which the mobile host acquires the information with regard to the address of an access node notified in the access node notifying step; an access node list creating step in which the mobile host creates an access node list from the information acquired in the access node acquisition step; an access node list requesting step in which the mobile host requests the paging agent for transmission of an access node list which is the address list of the access nodes existing on the neighboring link of the access link; an access node list notification step in which the mobile host extracts, from the access node list created in the access node list creating step, access nodes existing in the proximity of the access link and notifies the access nodes to the mobile host, in response to the request made in the access node list requesting step; an access node list acquisition step in which the mobile host acquires, from the paging agent, the access node list notified in the access node list notification step; an access node address acquisition step in which the mobile host acquires, from the data link layer, the data link layer address with regard to access nodes existing on the access link, triggered by the establishment of a connection to a link in the data link layer; and a network layer movement detection step in which the mobile host detects a default router, based on the data link layer address acquired in the access node address acquisition step and the access node list acquired in the access node list acquisition step, triggered by notification from the data link layer connection establishment notification step.

According to the above-mentioned packet communication system and movement detection method, the mobile host notifies, by transmitting to the paging agent, the information with regard to the address of access nodes such as access routers existing on the access link or access points. On the other hand, the paging agent acquires the information with regard to the address of the access nodes to which the mobile host had been connected in the past and creates an address list of access nodes. In addition, the mobile host requests for transmission of the access node list created in the paging agent and, in response to the request, the paging agent extracts and notifies, from the access node list, an access node in the proximity of the access link to which the mobile host is connected. Furthermore, if a connection to a link is established in the mobile host, the mobile host acquires, from the data link layer, a data link layer address of the access nodes on the access link, and detects a default router by searching from the access node list for an access node matching the address. In this manner, an address list with regard to access nodes in the proximity of the access link of the mobile host can be provided from the history information of the address of the access nodes to which the mobile host had been connected in the past, and based on the address list, detection of a default router for the mobile host can be quickly and readily performed. In addition, control packets in the mobile host during movement detection can be reduced, thereby allowing movement detection of the mobile host to be performed efficiently.

According to the present invention, the reachability of packet data can be increased by reducing the time required for the movement detection of the mobile host.

BRIEF DESCRIPTION OF THE DRAWINGS

FIG. 9 is a diagram illustrating an exemplary arrangement of the data stored in the node list storage unit of FIG. 5.

FIG. 11 is a diagram illustrating an arrangement of the data stored in the movement management information storage unit of FIG. 6.

FIG. 18 is a diagram illustrating an exemplary arrangement of the data stored in the node list storage unit of FIG. 15.

FIG. 19 is a flow chart showing the operation of the mobile host in the packet communication system of FIG. 14.

DESCRIPTION OF THE PREFERRED EMBODIMENTS

First Embodiment

Figure 1:
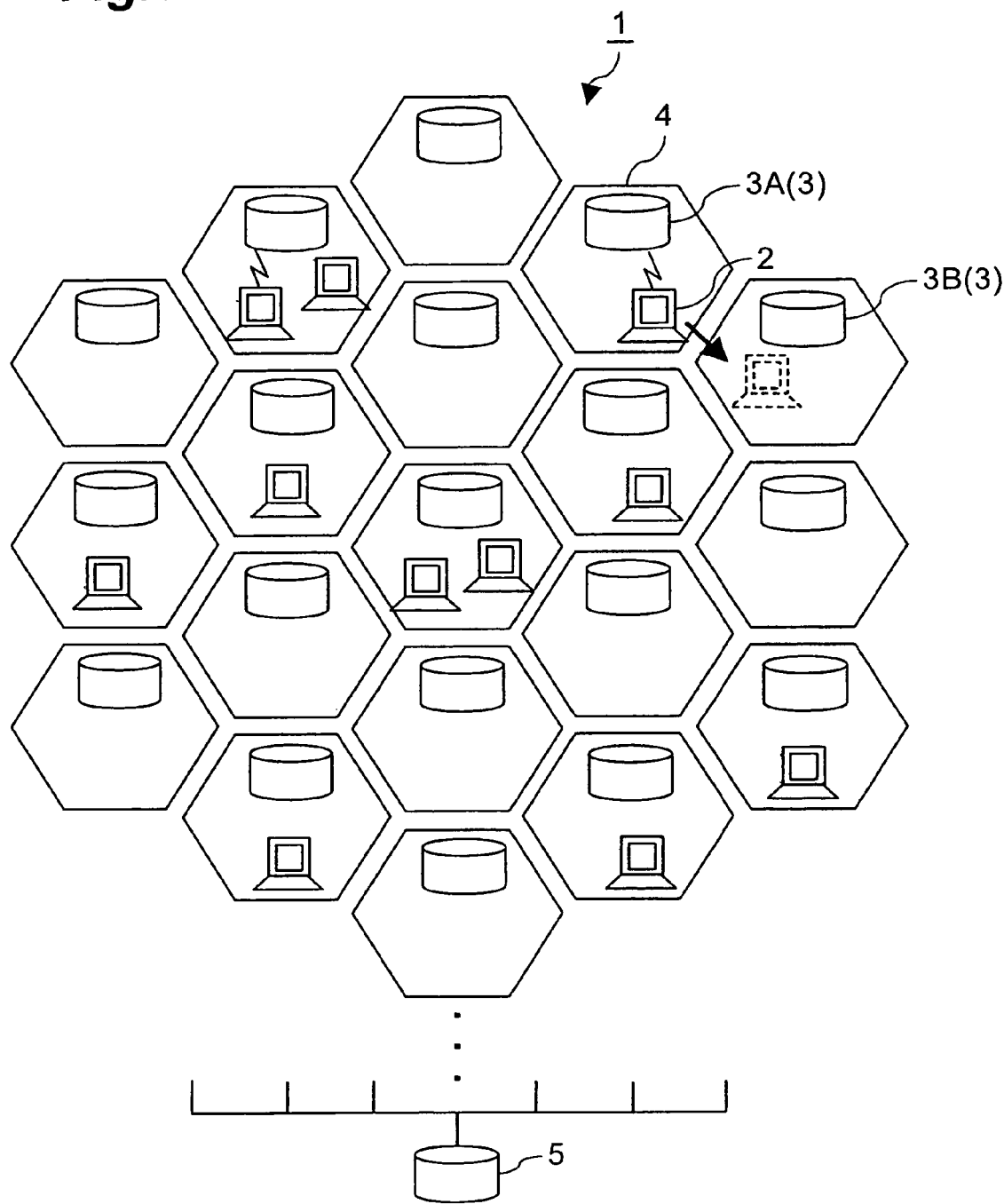
FIG. 1 is a schematic block diagram illustrating a first embodiment of the packet communication system according to the present invention.

FIG. 1 is a schematic block diagram illustrating a first embodiment of the packet communication system according to the present invention. A packet communication system 1 comprises a mobile host 2 (referred to as the MH, hereafter), an access router 3 (referred to as AR, hereafter) as the access node, and a paging agent 5 (referred to as PA, hereafter). In the packet communication system 1, having a single link 4 formed for each AR3, the links 4 are mutually connected to compose a communications network. Additionally, the single PA5 is connected to each of the links 4. In the following, each of the components will be described in detail.

The AR3, which is a router conforming to Mobile IP is provided to perform routing control of packet data which are transmitted and received in the packet communication system 1. Each AR3, accommodating the MH2 in the link 4, transmits and receives packet data between the MH2. Here, in the packet communication system 1, an access node for accommodating the MH2 in the link 4 is composed of the access router 3 only.

The PA5 is an IPP (IP Paging Protocol) conformable paging agent installed in each particular area unit of the packet communication system 1. While the MH2 is under paging control, the PA5 receives packet data addressed to the MH2 via a mobile agent (MA) not shown, buffers the packet data, and transmits paging packets for notifying the arrival of the packet data to the paging area in which the MH2 is located. In this manner, the MH2 can detect the arrival of and receive the packet data addressed to itself. In addition, if the MH2 made a crossover movement between paging areas, the PA5 manages the paging area in which the MH2 is located by receiving paging area re-registration from the MH2. The paging area is an area including a plurality of links 4, the range of which being determined and/or updated by an algorithm preliminarily configured in the PA5 or the MH2.

Figure 2:
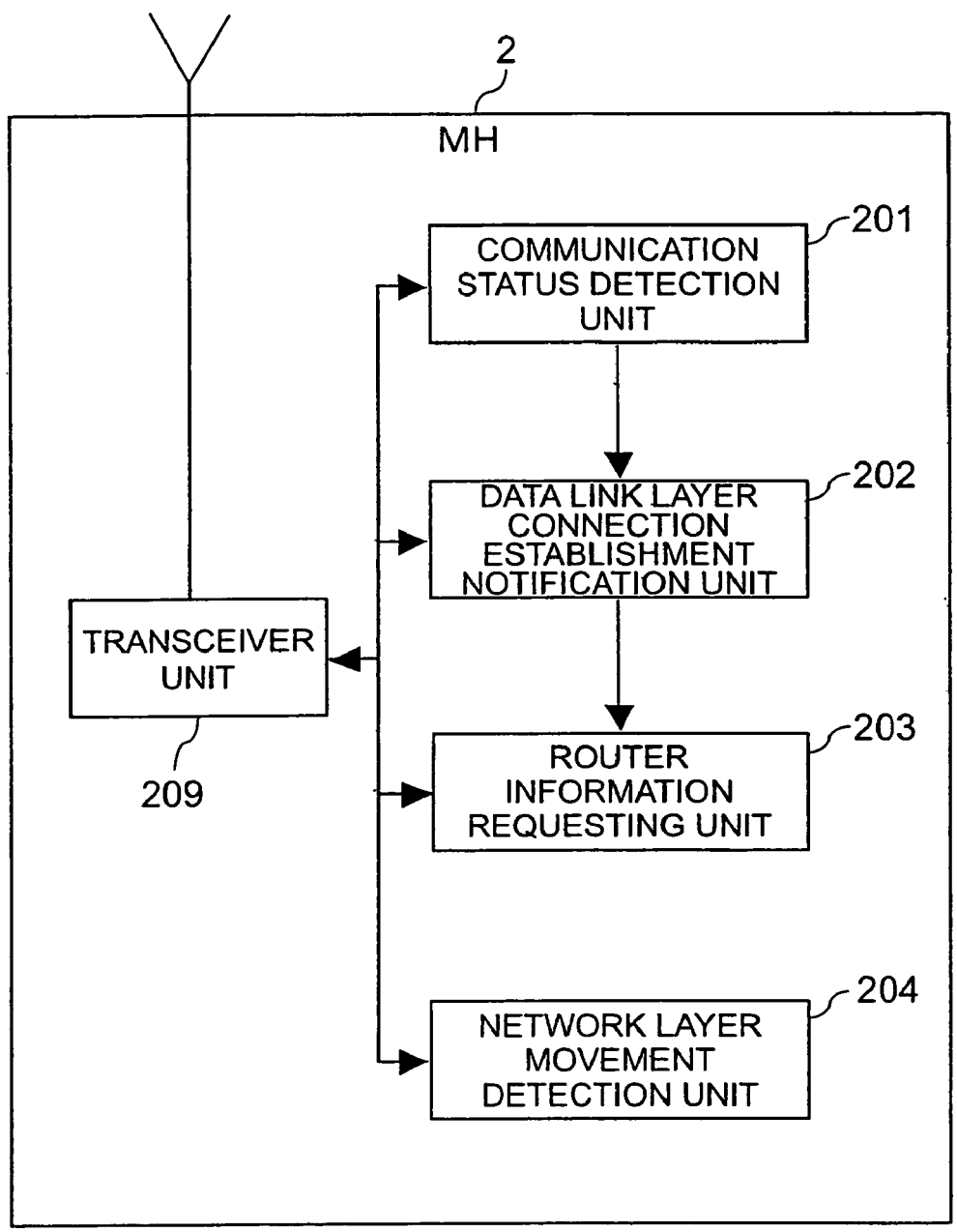
FIG. 2 is a schematic block diagram of the mobile host of FIG. 1.

The MH2 is a mobile host conforming to Mobile IP. As shown in FIG. 2, the MH2 comprises a transceiver unit 209 for transmitting and receiving data between the link 4, a communication status detection unit (communication status detecting means) 201, a data link layer connection establishment notification unit (data link layer connection establishment notification means) 202, a router information requesting unit (router information requesting means) 203, and a network layer movement detection unit (network layer movement detection means) 204.

The communication status detection unit 201, being a functional part belonging to the network layer, monitors the communication status in the transceiver unit 209, and detects that the communication status in the network layer is in a Dormant state (non-communicating state). Here, the term "Dormant state" refers to a state in which the mobile host is not transmitting or receiving packet data in the network layer. The communication status detection unit 201 monitors the interval of transmitting or receiving packet data in the transceiver unit 209, and determines that the MH2 is in a Dormant state if the transceiver unit 209 has not transmitted or received packet data for a predefined period since the last time it transmitted or received packet data. In such a case, the communication status detection unit 201 outputs a Dormant state notification to the data link layer connection establishment notification unit 202. In addition, if the communication status detection unit 201 detects transmission or reception of packet data by the transceiver unit 209 after the Dormant state notification was output, it determines that the MH2 has changed into an Active state (communicating state) and outputs a Dormant state cancellation notification to the data link layer connection establishment notification unit 202.

The data link layer connection establishment notification unit 202 is a functional part which belongs to the data link layer and notifies the network layer accommodating the MH2 that a connection to the link 4 in the data link layer has been established, when the MH2 is in a non-communicating state (Dormant state). Specifically, the data link layer connection establishment notification unit 202 detects, by reception of a link layer signal from the AR3, that a connection to the link 4 in the data link layer has been established during a period between the reception of Dormant state notification and the reception of Dormant state cancellation notification from the communication status detection unit 201. Upon establishment of the connection to the link 4 in the data link layer, the data link layer connection establishment notification unit 202 notifies it to the router information requesting unit 203 of the network layer, using Link up notification which is a type of information exchanging technique between the data link layer and the network layer.

Upon receipt of a Link up notification from the data link layer connection establishment notification unit 202, the router information requesting unit 203 transmits a router request signal (Router Solicitation) requesting for transmission of router advertisement information to the AR3 existing on the access link 4 which is the connecting link 4. The router information requesting unit 203 transmits the Router Solicitation to all the ARs3 existing on the access link 4, by using a broadcast address such as a link local multicast address of IPv6 (Internet Protocol version 6). Here, the term "link local multicast address" refers to an address for broadcasting to nodes within the same link. The router information requesting unit 203 outputs, to the network layer movement detection unit 204, the router advertisement information returned from the AR3 in response to the Router Solicitation.

The network layer movement detection unit 204 detects a default router of the MH2, based on the router advertisement information which was output from the router information requesting unit 203. A default router is the router of the next hop to be the first destination of the packet data when the MH2 is transmitting packet data into the packet communication system 1. The network layer movement detection unit 204 refers the IP address of the AR3 included in the router advertisement information and sets the IP address of the default router. In addition, the network layer movement detection unit 204 detects the movement of the MH2 based on whether or not the subnet prefix of the IP address of the detected default router has changed from that of the default router which was set immediately before. Furthermore, upon detection of a movement of the MH2, the network layer movement detection unit 204 determines, from the subnet address of the IP address of the default router, whether or not the movement is a crossover between paging areas. If the movement of the MH2 is a crossover between paging areas, the paging area in which the MH2 is located will be notified to the PA5 by performing re-registration of the paging area.

Figure 3:
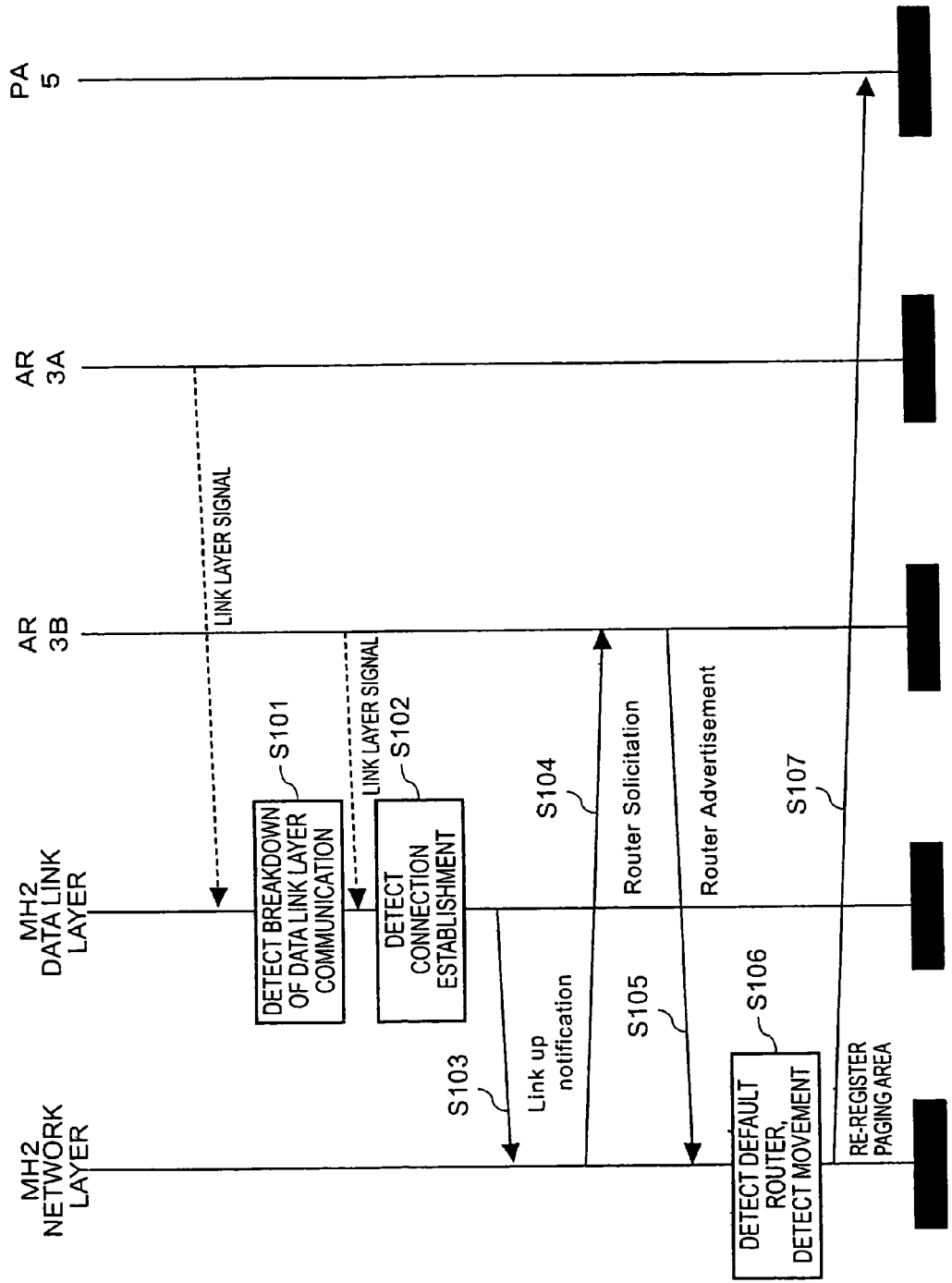
FIG. 3 is a sequence diagram illustrating the operation when performing movement detection of the mobile host in the packet communication system of FIG. 1.

Next, the operation of the packet communication system 1 according to the present embodiment will be described together with an explanation of the movement detection method according to an embodiment of the present invention. FIG. 3 is a sequence diagram illustrating the operation in the packet communication system 1 when performing movement detection of the mobile host 2.

First, if the communication status detection unit 201 of the MH2 detects that the MH2 is in a Dormant state, communication breakdown of link layer signals which was being received from the AR3A due to the movement of the MH2 is detected by means of the data link layer connection establishment notification unit 202 (step S101). Subsequently, if the MH2 moves to the link 4 consisting of the AR3B, establishment of a connection to the link 4 is detected by receiving link layer signals from the AR3B (step S102). As a result, establishment of a connection to the link 4 is notified to the network layer accommodating the MH2 by the data link layer connection establishment notification unit 202, via Link up notification (step S103).

On the other hand, the router information requesting unit 203 performs broadcast transmission of a Router Solicitation to all the AR3 existing on the access link 4, in response to the Link up notification which has been notified (step S104). As a result, router advertisement information is returned from the AR3B (step S105). Next, the network layer movement detection unit 204 performs configuration of the default router as well as detecting the movement of the MH2, based on the IP address of the AR3B included in the returned router advertisement information. If a movement of the MH2 is detected, it is further determined whether or not the movement of the MH2 is a crossover between paging areas (step S106). Then, if the move is a crossover between paging areas, the network layer movement detection unit 204 performs re-registration of the paging area for the PA5 (step S107).

According to the packet communication system 1 described above, in a non-communicating state (Dormant state), movement detection of the MH2 can be quickly and efficiently performed without changing the arrangement and/ or configuration of the AR3, since transmission of router advertisement information is requested to the AR3 in response to the link connection establishment notification from the data link layer to the network layer, and a default router is detected based on the router advertisement information returned in response to the request. As a result, the time period between the movement of the MH2 and the Binding Update registration of the PA5 to the network can be shortened, thereby improving the reachability of packet data addressed to the MH2.

Second Embodiment

Figure 4:
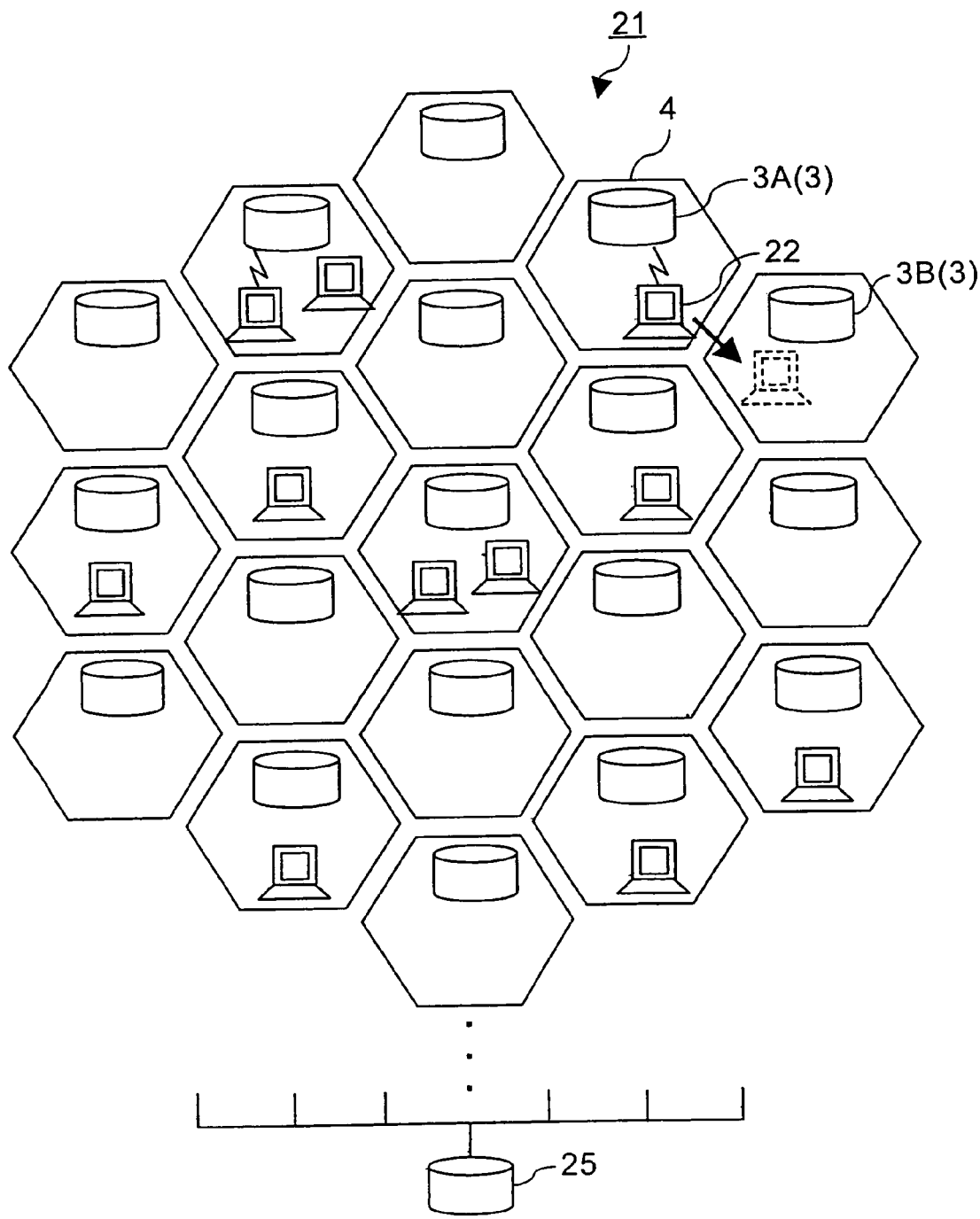
FIG. 4 is a schematic block diagram illustrating a second embodiment of the packet communication system according to the present invention.

Next, a second embodiment of the present invention will be described. FIG. 4 is a schematic block diagram illustrating a second embodiment of the packet communication system according to the present invention.

A packet communication system 21 according to the second embodiment of the present invention is different from the first embodiment in that, if the MH detects establishment of a connection in the data link layer during a Dormant state, a default router is detected based on the access node list which had preliminarily been acquired from the PA. In the following, the difference in the components of the packet communication system 21 between the first embodiment will be described in detail.

FIG. 4 is a schematic block diagram of the packet communication system 21 according to the second embodiment of the present invention. As shown in FIG. 4, also in the packet communication system 21, the access node for accommodating the MH22 in the link 4 is composed of only the AR3, as with the packet communication system 1.

Figure 5:
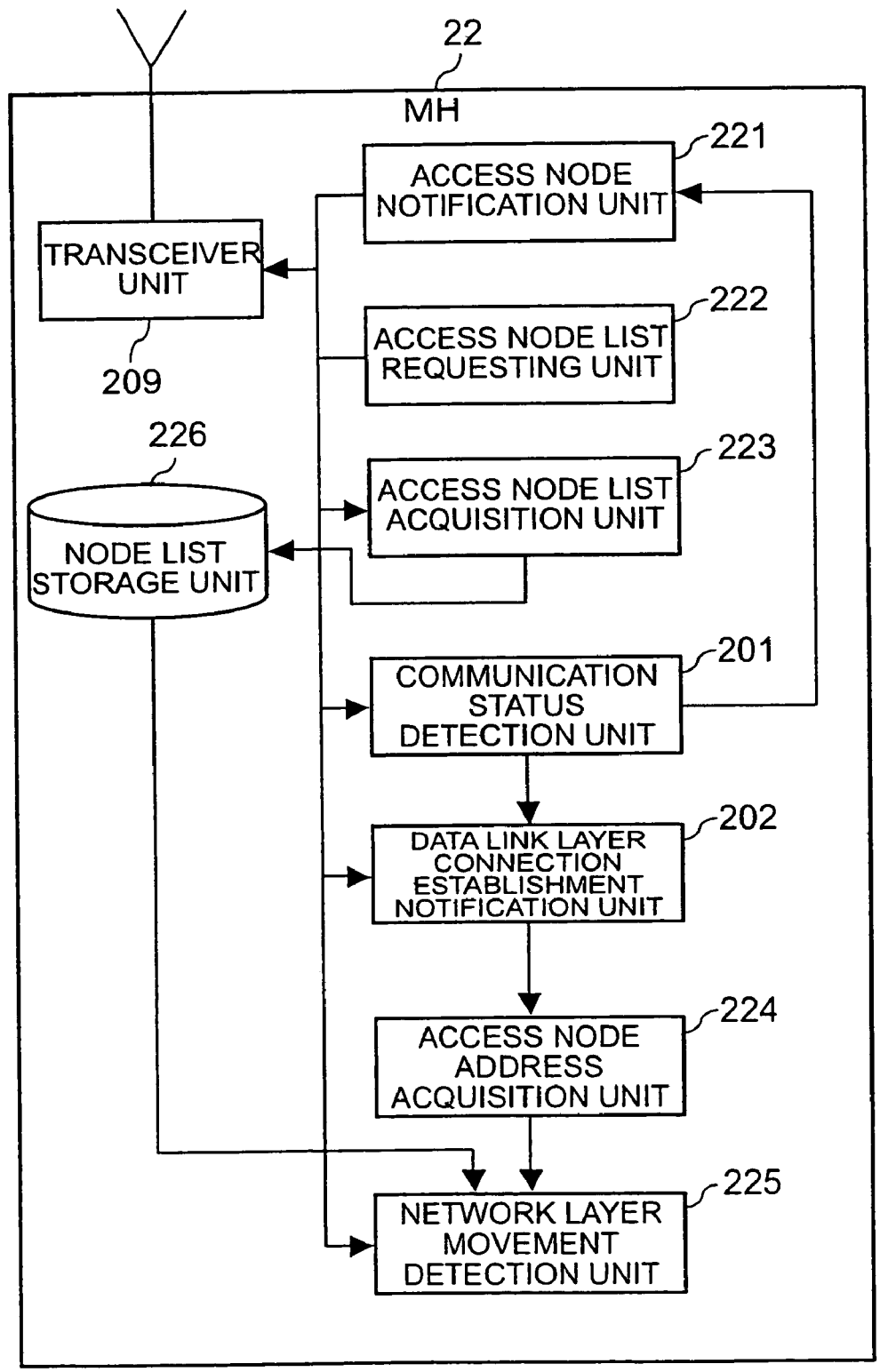
FIG. 5 is a schematic block diagram of the mobile host of FIG. 4.

Other than the transceiver unit 209, the communication status detection unit 201, the data link layer connection establishment notification unit 202, and the network layer movement detection unit 225, the MH22 in the packet communication system 21 comprises, as shown in FIG. 5, an access node notification unit 221 (access node notification means), an access node list requesting unit 222 (access node list requesting means), an access node list acquisition unit 223 (access node list acquisition means), an access node address acquisition unit 224 (access node address acquisition means), and a node list storage unit 226.

The access node notification unit 221 notifies the IP address (network layer address) and the MAC address (data link layer address) of the AR3 existing on the access link 4 to which the MH22 is connected to a PA25, if the MH22 has changed from an Active state into a Dormant state, as well as if the AR3 is detected on the link 4 which is located outside the paging area during the Dormant state. Here, the fact that the MH22 has changed from an Active state into a Dormant state and that it is in a Dormant state is determined by the notification from the communication status detection unit 201. Additionally, the MH22 maintains correspondence table data between each paging area and subnet prefix. The access node notification unit 221 acquires the IP address and the MAC address of the AR3 from the router advertisement information acquired by the AR3, and determines, based on the subnet prefix of the IP address, whether or not the AR3 is located outside the paging area which is registered as the current position of the MH22.

In this case, the access node notification unit 221 stores the notification of the IP address and the MAC address of the AR3 in the access node advertisement option added to a paging request packet (DMR: Dormant Method Request) and transmits it to the PA25. At the same time, the access node notification unit 221 also transmits other information acquired from the AR3 to the PA25. A DMR is the packet data for paging control, which requests the PA25 to change into paging control, or performs re-registration of the paging area.

Figure 7:
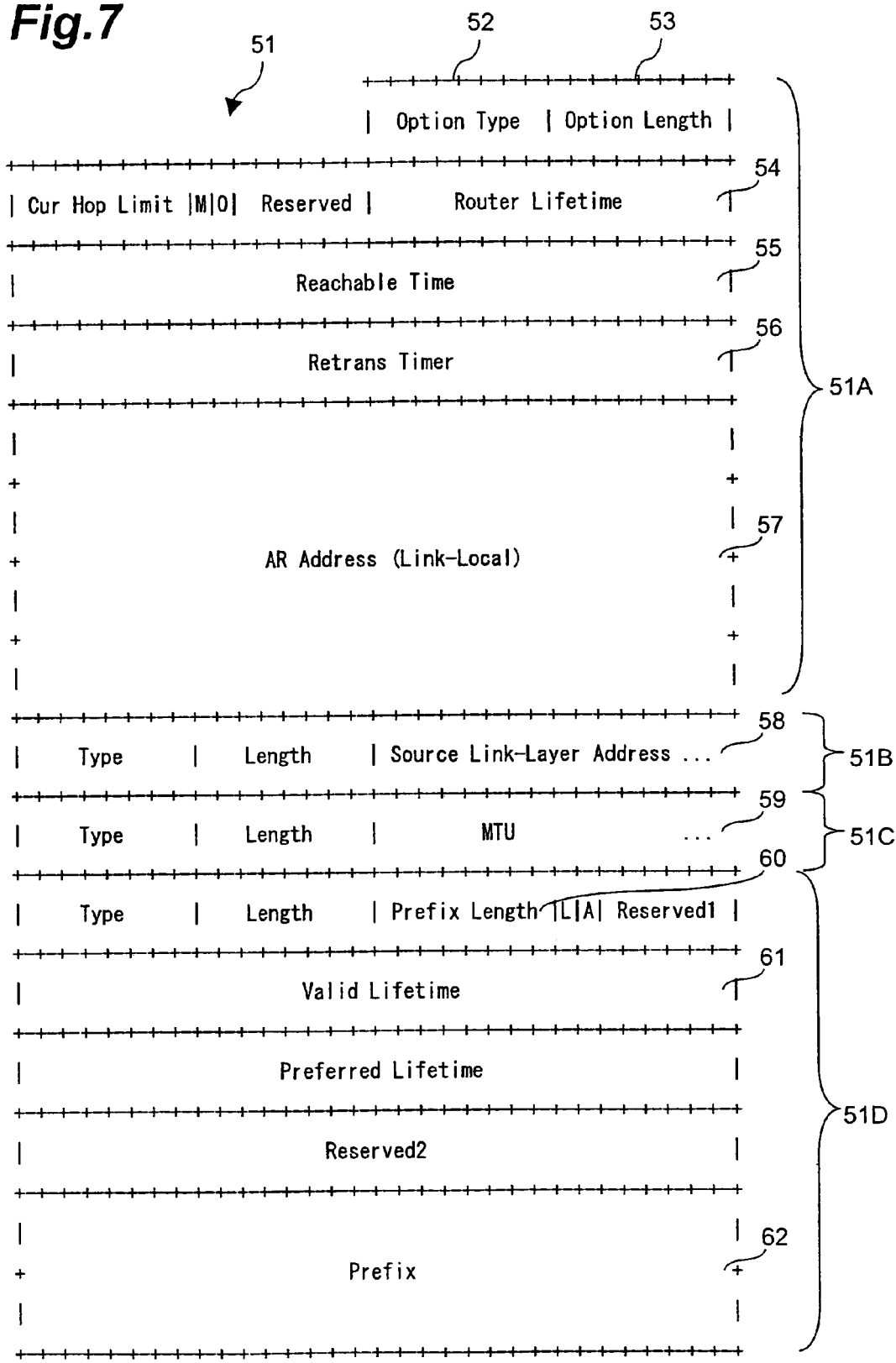
FIG. 7 is a diagram illustrating an example of data format of the access node advertisement option added to the DMR.

FIG. 7 is a diagram illustrating an exemplary data format of an access node advertisement option 51 added to the DMR. As shown in the diagram, the access node advertisement option 51 comprises data blocks 51A, 51B, 51C, and 51D. The data blocks 51A comprises a field 52 "Option Type" for identifying the data block 51A, a field 53 "Option Length" for describing the header length of the data block 51A, a field 54 for storing "Router Lifetime" which is the lifetime with regard to the availability as a default router, a field 55 for storing "Reachable Time" which is the communicatable time after reception of the router advertisement information from and the AR3, a field 56 for storing "Retrans Timer" which is the retransmission time interval of the Router Solicitation to the AR3, and a field 57 for storing "AR Address" which is the link local address of the AR3.

In addition, the data block 51B includes, a field 58 for storing "Source Link-Layer Address" which is the MAC address of the AR3, and the data block 51C includes a field 59 for storing "MTU" which is the maximum packet data size to the AR3, respectively. Furthermore, the data block 51D comprises a field 60 for storing "Prefix Length" which is the subnet prefix length of the AR3, a field 61 for storing "Valid Life time" which is the effective time period of the subnet prefix when determining whether or not the AR3 exists on the link, and a field 62 for storing "Prefix" which is the IP address of the AR3. Here, the IP address of the AR3 may be divided into a portion of the subnet prefix to be stored in the field 62 and a portion of lower 64 bits to be stored in the field 57.

For example, if an IP address "2000:y1:x1::/64" and a MAC address "aa:bb:cc:dd:ee:f1" are acquired from the AR3, "aa:bb:cc:dd:ee:f1" is stored in the field 58, "2000:y1:x1::/64" is stored in the field 62, then they are added to and transmitted with the DMR.

Returning to FIG. 5, the access node list requesting unit 222 is a functional part which requests the PA25 for transmission of an access node list which is a list of IP addresses and MAC addresses with regard to the AR3 existing within the paging area in which the MH22 is currently located and neighboring links thereof. In this case, the access node list requesting unit 222 transmits a request for transmission of an access node list to the PA25 by adding an access node advertisement option to the DMR.

The access node list acquisition unit 223 is a functional part which acquires from the PA25 the access node list transmitted in response to the request of the access node list requesting unit 222. In this case, the access node list acquisition unit 223 receives the access node list from the PA25 in a condition wherein it is stored in the access node list option added to the paging request response packet (DMA: Dormant Mode Acknowledgement). The paging request response packet is a response from the PA25 to the DMR sent by the MH22.

Figure 8:
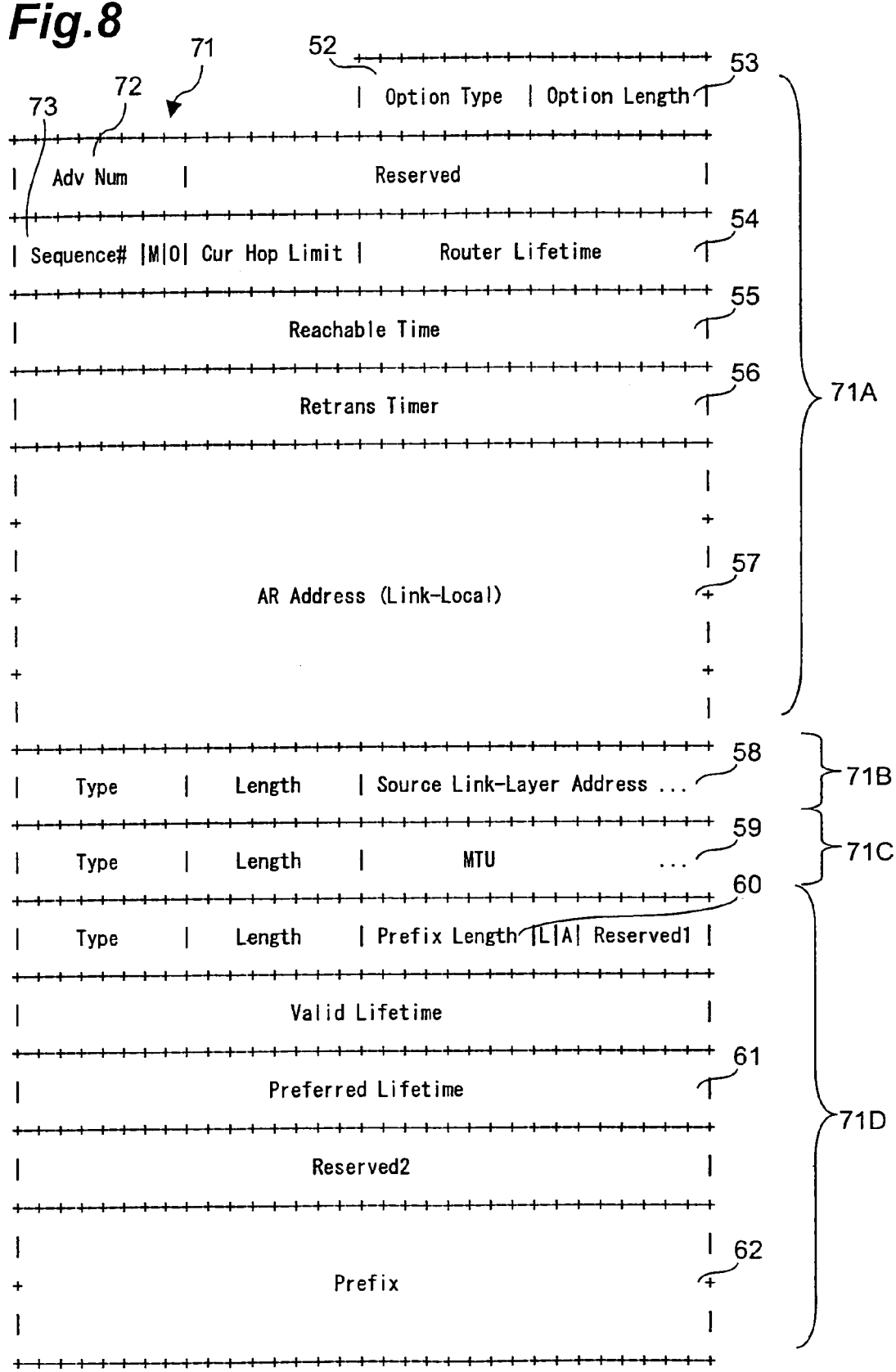
FIG. 8 is a diagram illustrating an example of data format of the access node list option added to the paging request response packet.

FIG. 8 is a diagram illustrating an exemplary data format of an access node list option 71 added to the paging request response packet. As shown in the diagram, the access node list option 71 comprises data blocks 71A, 71B, 71C, and 71D, with a basic arrangement approximately similar to the access node advertisement option 51. The difference between the access node advertisement option 51 lies in that the data block 71A stores "Adv Num" which is the number of AR to be notified in the access node list option 71 and "Sequence" which is the number for uniquely identifying the AR to be notified, respectively into fields 72 and 73, and that the data blocks 71A, 71B, 71C, and 71D are added repeatedly as many as the number of ARs to be notified. However, the portion to be repeated with regard to the data block 71A is the field 73 "Sequence" and the fields following, whereas the field 52 "Option Type", the field 53 "Option Length", and the field 72 "Adv Num" are stored only in the first data block. For example, when the IP address "2000:y1:x1::/64" and the MAC address "aa:bb:cc:dd:ee:f1" of the AR3 are acquired, they are received in a condition wherein "aa:bb:cc:dd:ee:f1" is stored in the field 58, and "2000:y1:x1::/64" is stored in the field 62.

In addition, the access node list acquisition unit 223 associates an IP address with an MAC address having the same Sequence value and stores them into the node list storage unit 226, after having received the access node list. FIG. 9 shows an exemplary data arrangement thus stored in the node list storage unit 226. As shown in FIG. 9, the IP address "Prefix: 2000:y1:x1::/64" of the AR3 and the MAC address "Link-layer Address:aa:bb:cc:dd:ee:f1" of the AR3 received as the access node list are stored in association with the Sequence. In addition, the node list storage unit 226 also stores other information with regard to AR acquired by the access node list acquisition unit 223.

Returning to FIG. 5, the access node address acquisition unit 224 is a functional part for acquiring, from the data link layer, the MAC address with regard to the AR3 existing on the access link 4 to which the MH22 is connected, when a Link up notification is notified from the data link layer connection establishment unit 202. The access node address acquisition unit 224 acquires the MAC address with regard to the AR3 existing on the access link 4 by extracting from the link layer signal transmitted from the AR3 to the data link layer of the MH22, adds it to the Link up notification, and notifies it to the network layer.

The network layer movement detection unit 225 is a functional part for detecting a default router, based on the MAC address of the AR3 notified of from the access node address acquisition unit 224, and the access node list stored in the node list storage unit 226. For example, if "aa:bb:cc:dd:ee:f1" is notified as the MAC address of the AR3 from the access node address acquisition unit 224 in the example of FIG. 9, the network layer movement detection unit 225 searches for, from the access node lists stored in the-node list storage unit 226, an access node list with a matching MAC address and detects the IP address "2000:y1:x2::/64" of the AR3. The network layer movement detection unit 225 sets the IP address and the MAC address of the detected the AR3 as the default router.

In addition, the network layer movement detection unit 225 detects the movement of the MH22, based on whether or not the subnet prefix of the IP address of the detected default router has changed from that of the default router which was set immediately before. Furthermore, if the network layer movement detection unit 225 detected the movement of the MH22, it determines, from the subnet address of the IP address of the default router, whether or not the movement is a crossover between paging areas. If the movement of the MH22 is a crossover between paging areas, the paging area in which the MH22 is located will be updated by transmitting a DMR to the PA25.

Figure 6:
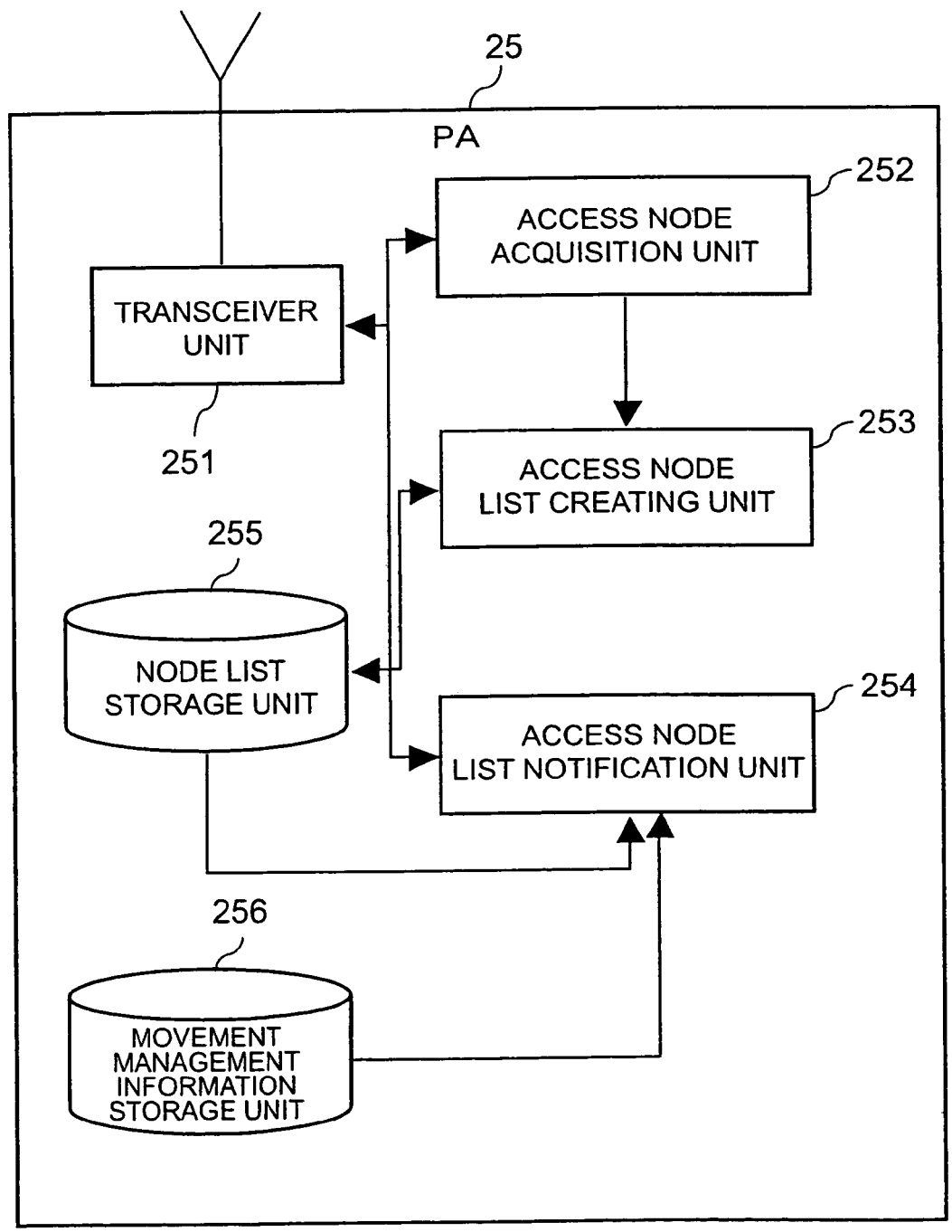
FIG. 6 is a schematic block diagram of the paging agent of FIG. 4.

The PA25 in the packet communication system 21 comprises, as shown in FIG. 6, a transceiver unit 251 for performing transmission and reception of data between the link 4, an access node acquisition unit 252 (access node acquisition means), an access node list creating unit 253 (access node list creating means), an access node list notification unit 254 (access node list notification means), a node list storage unit 255, and a movement management information storage unit 256.

The access node acquisition unit 252, is a functional part for acquiring, from the MH22, the IP address and the MAC address of the AR3 existing on the access link 4 to which the MH22 is connected. When receiving a DMR from the MH22, the access node acquisition unit 252 acquires the IP address and the MAC address of the AR3 in a condition wherein they are stored within access node advertisement option added to the DMR. The access node acquisition unit 252 outputs the IP address and the MAC address of the acquired AR3 to the access node list creating unit 253.

The access node list creating unit 253 is a functional part for creating an access node list from the IP address and the MAC address of the AR3 acquired by the access node acquisition unit 252, and storing them in the node list storage unit 255. The access node list creating unit 253 adds, as an entry to the access node list stored in the node list storage unit 255, and records the IP address and the MAC address of the notified AR3 which has been stored in the DMR. The arrangement of the data stored in the node list storage unit 255 is similar to that of the node list storage unit 226 (see FIG. 9).

The access node list notification unit 254 is a functional part for notifying to the MH22 an access node list with regard to the AR3 existing within the paging area in which the MH22 is located and the AR3 existing on neighboring links, from the access node lists stored in the node list storage unit 255. The access node list notification unit 254 notifies the access node list, in response to the request from the access node list requesting unit 222 of the MH22. The access node list notification unit 254 stores this access node list in the access node list option which will be added to the paging request response packet, and transmits it to the MH22. The PA25 maintains correspondence table data between each paging area and subnet prefix. Thus the access node list notification unit 254 determines, from the subnet prefix of the IP address of the AR3 included in the access node list, whether or not the AR3 specified by the access node list exists within the paging area registered as the location of the MH22.

In addition, the access node list notification unit 254 specifies the AR3 existing in the neighboring link of the paging area in which the MH22 is located, in the following two methods.

In other words, in a case wherein the PA25 manages all the information with regard to the network topology of the packet communication system 21, the PA25 specifies the subnet prefix of the neighboring link by means of the information and specifies the AR3 having the IP address including the subnet prefix.

Figure 10:
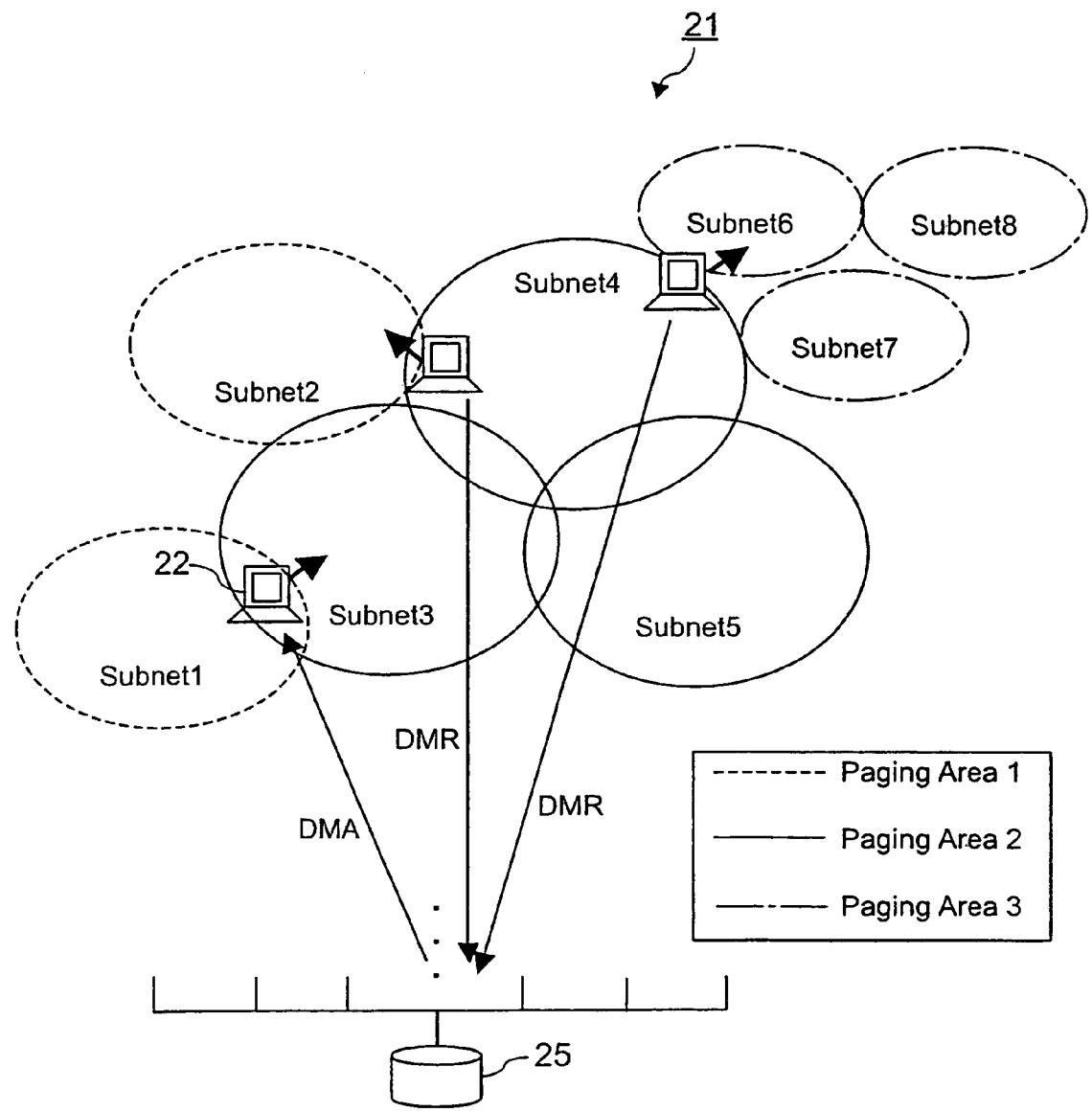
FIG. 10 is a diagram illustrating an image when the paging agent collects a movement history of the mobile host.

In addition, the access node list notification unit 254 may also employ a method for specifying the AR3 based on the movement history of the MH22. FIG. 10 is a diagram illustrating an image of the PA25 when collecting the movement history of the MH22. If the MH25 in a Dormant state made a movement which is a crossover between paging areas, the PA25 receives a Dormant Method Request (DMR) from the MH22. On this occasion, the PA25, after having specified the source address which transmitted the DMR, recognizes the after-movement subnet by means of the subnet prefix of the source address. IF the MH22 moves from the subnet 4 of the paging area 2 to the subnet 6 of the paging area 3, according to FIG. 10, the PA25 recognizes the subnet prefix of the subnet 6 by means of the DMR transmitted from the MH22. The PA25 stores the after-movement subnet prefix thus recognized from the DMR into the movement management information storage unit 256 for each paging area.

FIG. 11 illustrates an arrangement of the data thus stored in the movement management information storage unit 256. As shown in FIG. 11, the movement management information storage unit 256 stores, for each paging area identified by a paging area number, subnet prefixes with regard to a plurality of subnets included in the paging area, in association with the subnet prefix with regard to the after-movement subnet recognized as discussed above. Here, in FIG. 11, although a plurality of subnet prefixes with regard to the after-movement subnet are stored for a paging area, a single subnet prefix may be stored for a paging area.

Thus, the access node list notification unit 254 refers, from the movement management information storage unit 256, the subnet prefix of the after-movement subnet corresponding to the paging area in which the MH22 is located. The AR3 on the neighboring link can be specified by specifying the subnet prefix as the subnet prefix of the neighboring link.

Figure 12:
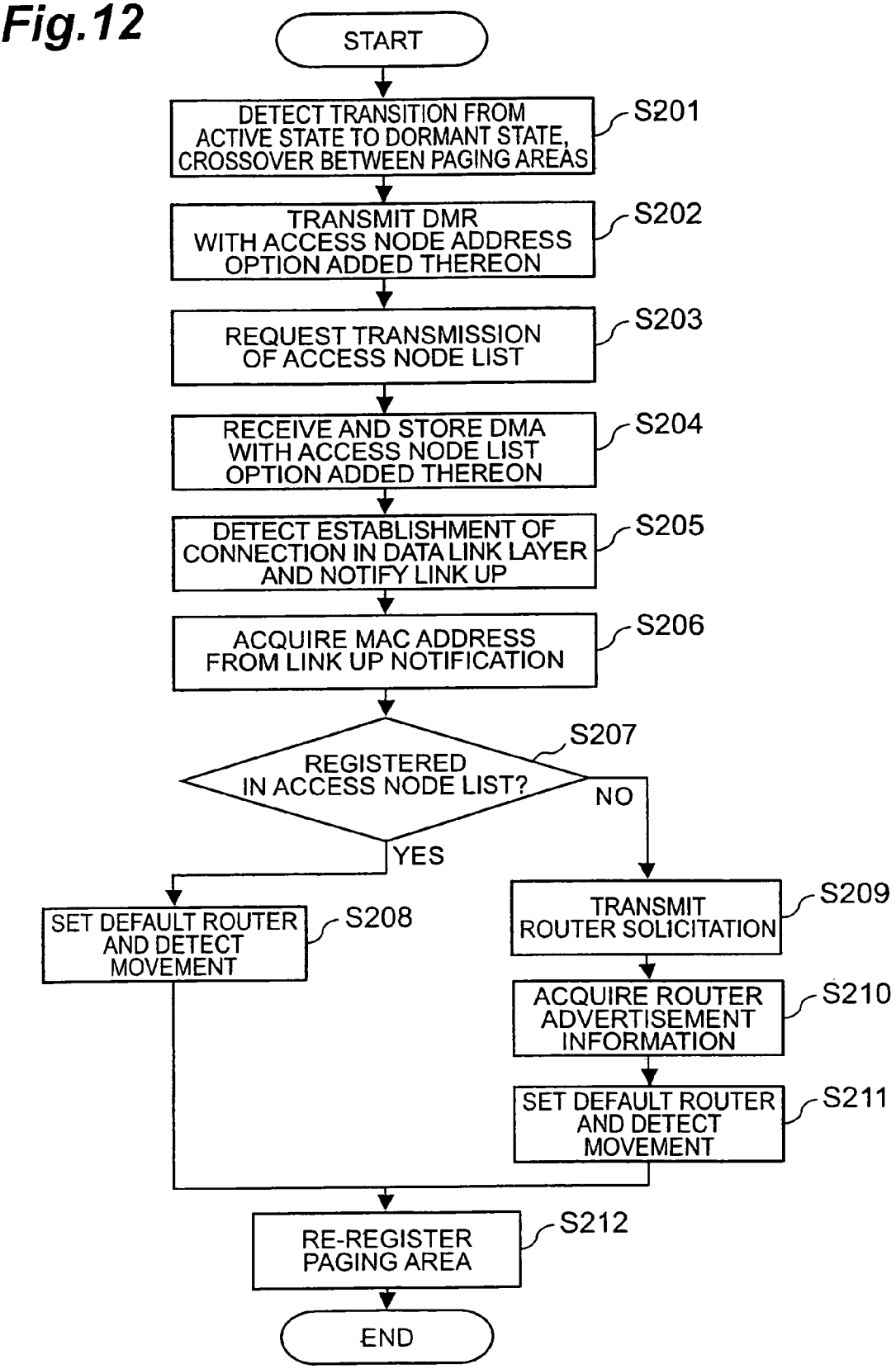
FIG. 12 is a flow chart showing the operation of the mobile host in the packet communication system of FIG. 4.

Next, the operation of the packet communication system 21 according to the present embodiment will be described, as well as the movement detection method according to the embodiment of the present invention. FIG. 12 is a flow chart illustrating the operation of the MH22 in the packet communication system 21.

First, the access node notification unit 221 detects the change of the MH22 status from an Active state to a Dormant state, or the AR3 on the link 4 located outside the paging area, in a Dormant state (step S201). Next, the access node notification unit 221 stores the IP address and the MAC address of the AR3 on the access link 4 into the access node advertisement option added to the DMR, and transmits it to the PA25 (step S202). Subsequently, the access node list requesting unit 222 requests the PA25 for an access node list with regard to the AR3 existing within the paging area in which the MH22 is located and the AR3 existing on the neighboring link (step S203). In response, the access node list acquisition unit 223 receives, from the PA25, a paging request response packet with the access node list option added thereon storing an access node list, and stores it into the node list storage unit 226 (step S204).

Subsequently, if the communication status detection unit 201 detects that the MH22 is in a Dormant state, data link layer connection establishment notification unit 202 detects establishment of a connection to the link 4 in the data link layer and a Link up is notified to the network layer (step S205). At the same time, the access node address acquisition unit 224 acquires the MAC address of the AR3 on the access link 4 to which a connection has been established and notifies it to the network layer (step S206). In response, the network layer movement detection unit 225 determines, based on the MAC address of the AR3 notified from the access node address acquisition unit 224, whether or not the relevant MAC address exists in the access node list by referring to the node list storage unit 226 (step S207).

If, according to the result of the above determination, the relevant MAC address exists in the access node list (step S207; YES), the network layer movement detection unit 225 sets the IP address and the MAC address included in the access node address as the default router, and detects the movement of the MH22 (step S208). Next, if a movement of the MH22 is detected, the network layer movement detection unit 225 further determines whether or not the movement is a crossover between paging areas, and performs re-registration of the paging area based on the result of its determination (step S212).

If, on the other hand, the relevant MAC address does not exist in the access node list (step S207; NO), the network layer movement detection unit 225 performs broadcast transmission of a Router Solicitation to the access link 4 (step S209). As a result, the network layer movement detection unit 225 acquires router advertisement information from the AR3 on the access link 4 (step S210). Then, the network layer movement detection unit 225 sets the default router by means of the acquired router advertisement information and, after having performed movement detection of the MH22 (step S211), the process proceeds to step S212.

Figure 13:
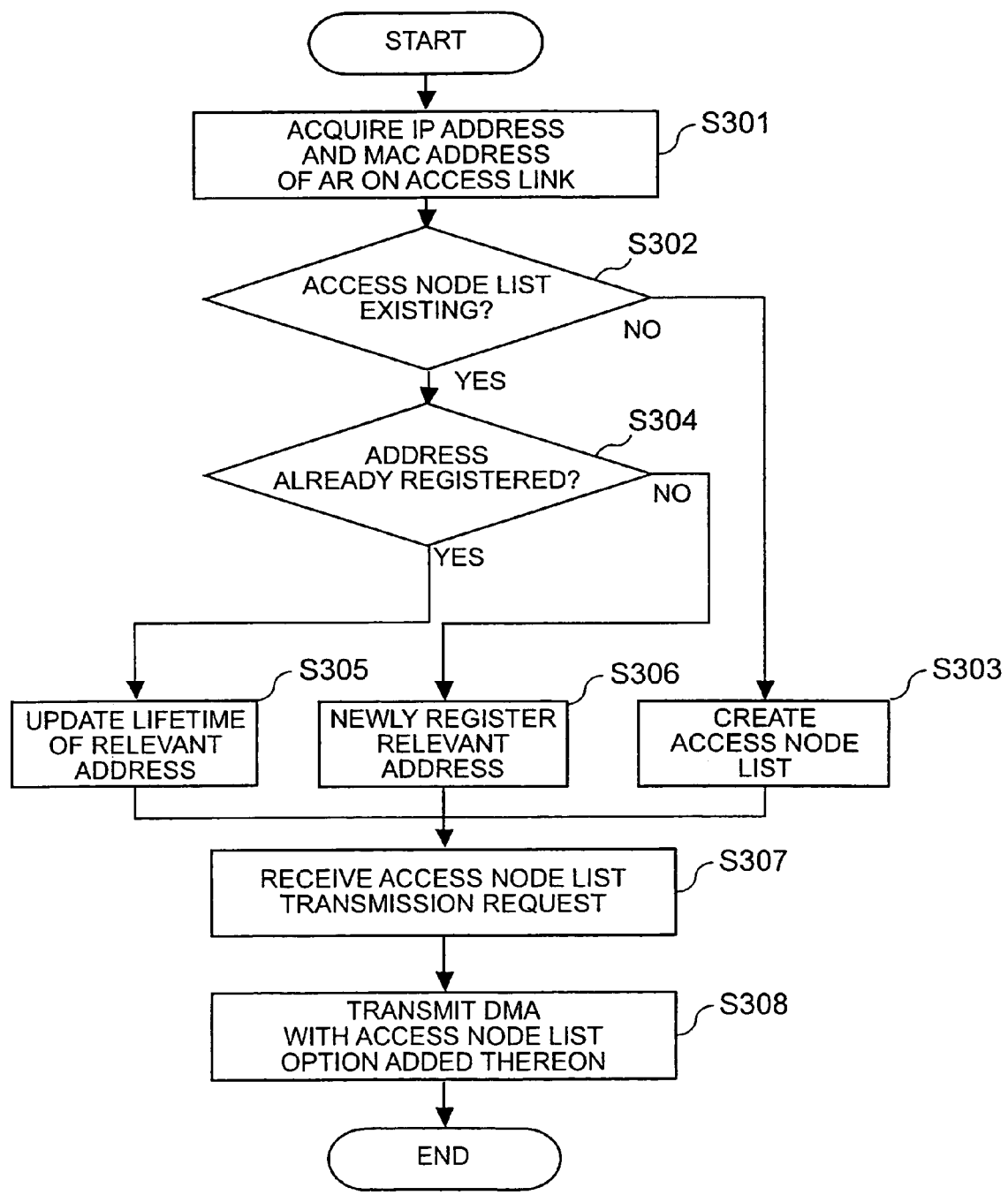
FIG. 13 is a flow chart showing the operation of the paging agent in the packet communication system of FIG. 4.

Next, referring to FIG. 13, the operation of the PA25 in the packet communication system 21 will be described. FIG. 13 is a flow chart illustrating the operation of the PA25 in the packet communication system 21.

First, the access node acquisition unit 252 receives a DMR from the MH22, and acquires, from the access node advertisement option added to the packet data, the IP address and the MAC address of the AR3 on the access link 4 of the MH22 (step S301). Next, the access node list creating unit 253 determines whether or not the access node list has already been created in the node list storage unit 255 (step S302). If, according to the result of the determination, an access node list has not been created (step S302; NO), the access node list creating unit 253 creates an access node list including the IP address and the MAC address of the AR3, stores it into the node list storage unit 255 (step S303), and the process proceeds to step S307.

On the other hand, if, according to the result of the above determination, the access node list has already been created (step S302; YES), the access node list creating unit 253 determines whether or not the IP address and the MAC address of the AR3 have already been registered in the access node list (step S304). If, according to the result of the above determination, the IP address and the MAC address have already been registered in the access node list (step S304; YES), the access node list creating unit 253 updates the lifetime of the relevant address (Router Lifetime) included in the access node list (step S305). If, on the other hand, the IP address and the MAC address are not registered in the access node list (step S304; NO), the access node list creating unit 253 additionally records the relevant address into the access node list as a new entry (step S306).

Subsequently, the access node list notification unit 254 receives, from the MH22, an access node list transmission request included in the DMR (step S307). Then the access node list notification unit 254 adds to the paging request response packet and transmits, the access node list with regard to the AR3 existing within the paging area in which the MH22 is located and the AR3 existing on the neighboring link (step S308).

Also in the packet communication system 21 described above, the MH22 notifies, by transmitting to PA25, the information with regard to the address of the AR3 existing on the access link 4. In response, the PA25 acquires the information with regard to the address of the AR3 to which the MH22 has been connected in the past to create an address list of the AR3. In addition, the MH22 requests for transmission of the access node list created in the PA25 and, in response to the request, the PA25 extracts from the access node list and notifies the AR3 in the proximity of the access link 4 to which the MH22 is connected. Furthermore, if a link connection establishment is notified from the data link layer to the network layer during a Dormant state in the MH22, the data link layer address of the AR3 on the access link 4 is acquired, and the default router is detected by searching from the access node list for the AR3 with a matching address. In this manner, an address list with regard to the AR3 in the proximity of the access link 4 of the MH22 is provided from the history information of the address of the AR3 to which the MH22 was connected in the past, whereby detection of the default router in the MH22 can be readily performed based on the address list. In addition, movement detection of the mobile host can be efficiently performed because the number of control packets in the MH22 is reduced when detecting its movement.

Third Embodiment

Figure 14:
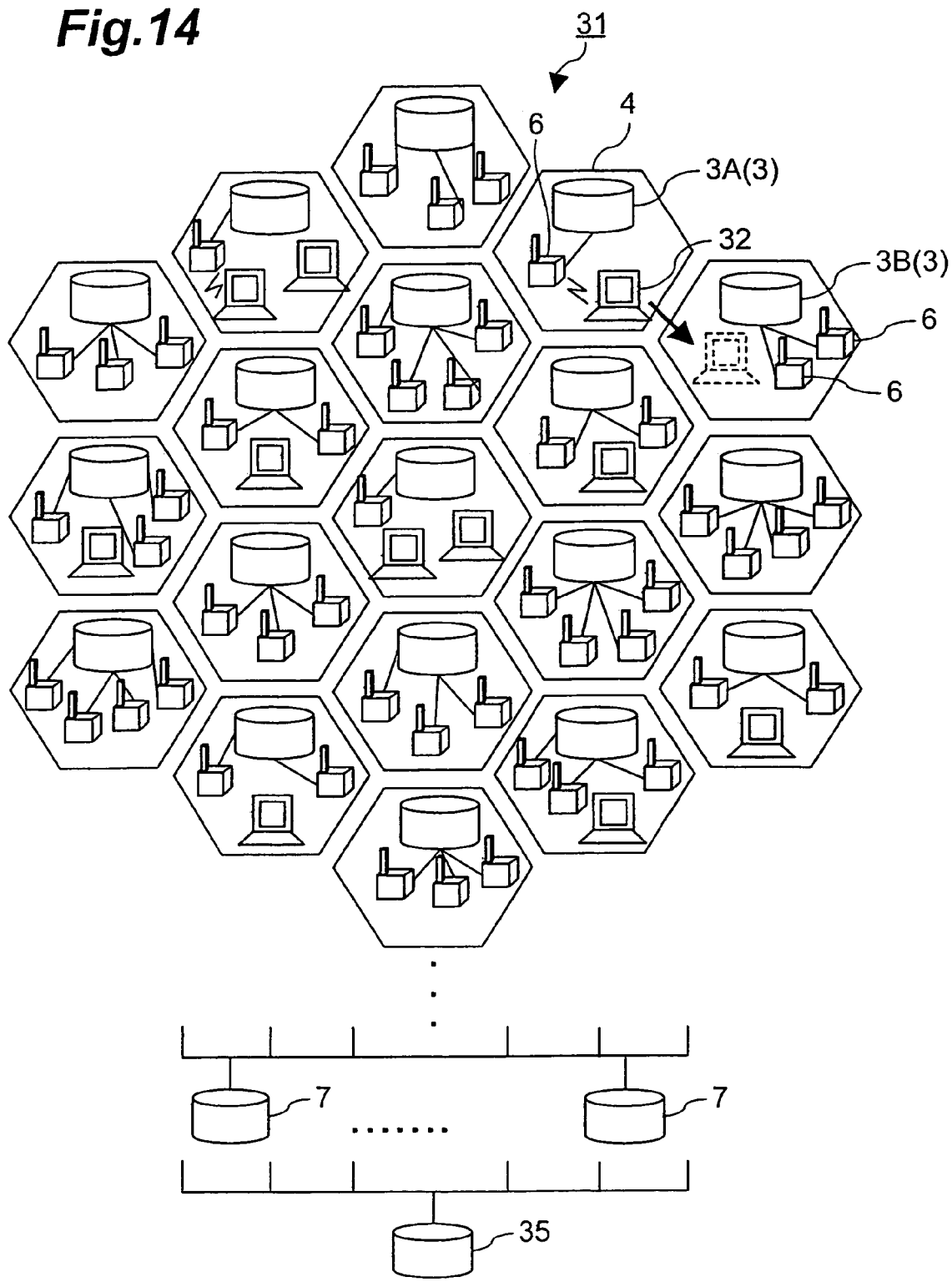
FIG. 14 is a schematic block diagram illustrating a third embodiment of the packet communication system according to the present invention.

Next, a third embodiment of the present invention will be described. FIG. 14 is a schematic block diagram illustrating a third embodiment of the packet communication system according to the present invention.

A packet communication system 31 according to the third embodiment of the present invention is different from the second embodiment in that the PA creates an access node list by collecting access node list from a Mobility Anchor Point (MAP), and that the access nodes in the link 4 comprise an AR and an Access Point (AP). In the following, the difference of the components of the packet communication system 31 from those of the second embodiment will be described in detail.

As shown in FIG. 14, the packet communication system 31 comprises an MH32, an AR3 and an AP6 as access nodes, a PA35, and an MAP7 which is the mobility anchor point. A plurality of APs6 are provided in the link 4, as nodes for accommodating the MH32 in the link 4. The AP6 is connected to the AR3 for relaying packet data transmitted and received between the MH32 and the AR3.

In addition, the MAP7, or a mobility anchor point conforming to HMIP (hierarchical Mobile IP), is a node for managing more local movement of the MH32 by managing the correspondence between the Home address (HoA) and the Care of Address (CoA) of the MH32.

Figure 15:
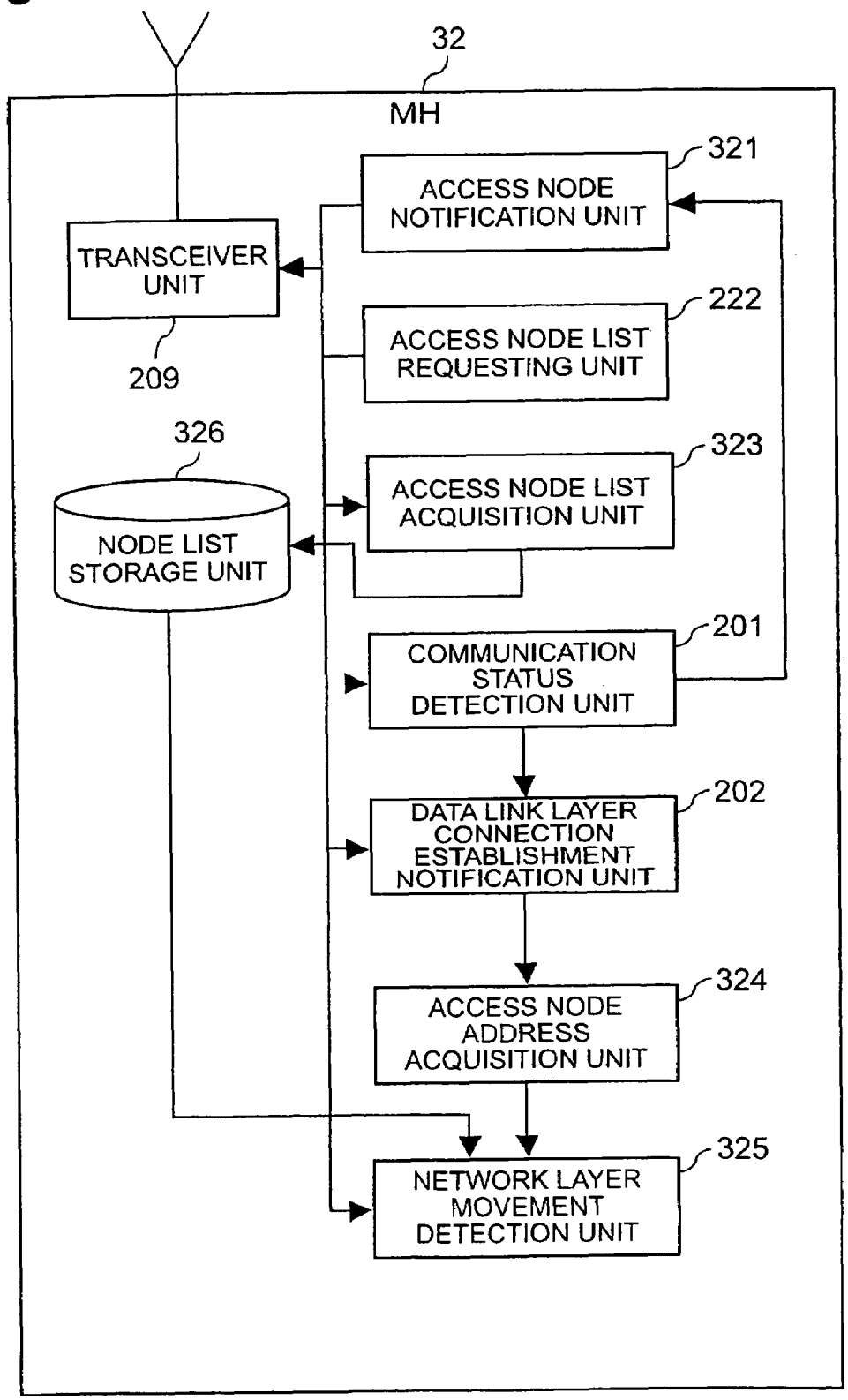
FIG. 15 is a schematic block diagram of the mobile host of FIG. 14.

Next, the components of the MH32 in packet communication system 31 will be described, referring to FIG. 15.

Figure 16:
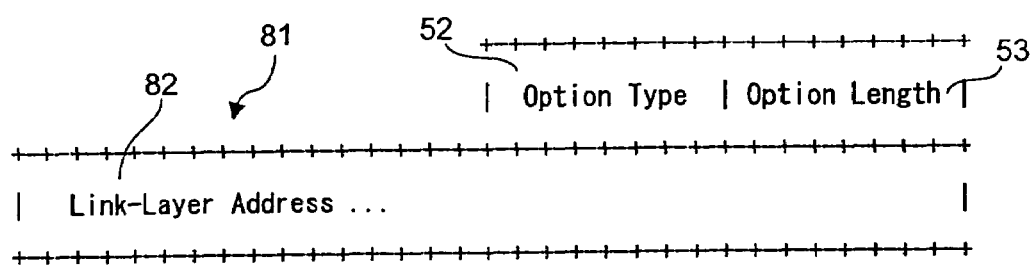
FIG. 16 is a diagram illustrating an example of data format of the access point address option added to Binding Update packet.

When transmitting a Binding Update (BU) packet to the MAP7, an access node notification unit 321 also transmits the MAC address of the AP6 existing on the connecting access link 4 and the IP address of the AR3. In this case, the access node notification unit 321 acquires the IP address of the AR3 and the MAC address of the AP6 from the router advertisement information acquired from the AR3. In addition, the access node notification unit 321 stores the IP address of the AR3 into the access node advertisement option (see FIG. 7) and the MAC address of the AP6 into the access point address option, then adds them to the Binding Update packet and transmits to the MAP7. FIG. 16 is a diagram illustrating an exemplary data format of an access point address option 81 added to the Binding Update packet. As shown in FIG. 16, the access point address option 81 has a field 82 storing the MAC address "Link-Layer Address" of the AP6. The MAC address of the AP6 and the IP address of the AR3, which have been transmitted here, are created and saved as an access node list by the MAP7.

An access node list acquisition unit 323 receives the paging request response packet with the access node list option transmitted from the PA35 added thereon, in response to the request of the access node list requesting unit 222. In this access node list option, either the MAC address of the AR3 or the MAC address of the AP6 on the link 4 in which the AR3 exists is stored in the "Source Link-Layer Address" of the field 58, together with the same "Sequence" value. Here, the "Type" value of the data block 71B indicates which one, i.e., the MAC address of the AR3 or the MAC address of the AP6, is the address stored in the "Source Link-Layer Address" (see FIG. 8). After having received the access node list, the access node list acquisition unit 323 associates the IP address of the AR3 with the MAC address of the AP6 having the same Sequence value and stores them into a node list storage unit 326. FIG. 18 shows an exemplary arrangement of data stored in the node list storage unit 326 in this manner. As shown in FIG. 18, an IP address "Prefix:2000:y1:x1::/64" of the AR3 received as an access node list and a MAC address "Link- Layer Address:gg:bb:cc:dd:ee:f1" of the AP6 are stored in association with the Sequence.

Returning to FIG. 15, when a Link up notification is notified from the data link layer connection establishment notification unit 202, an access node address acquisition unit 324 acquires, from the data link layer, the MAC address with regard to the AP6 existing on the access link 4 to which the MH32 is connected, and notifies it to the network layer.

The network layer movement detection unit 325 is a functional part for detecting the default router based on the MAC address of the AP6 notified from the access node address acquisition unit 324 and the access node list stored in the node list storage unit 326. For example, if "hh:bb:cc:dd:ee:f1" is notified from the node address acquisition unit 324 as the MAC address of the AP6, in the example of FIG. 18, an access node list with a matching MAC address is searched for from the access node lists stored in the node list storage unit 326, and an IP address "2000:y1:x2::/64" of the AR3 on the same link as with the AP6 is detected. The network layer movement detection unit 325 sets the IP address of the detected AR3 as the default router.

Figure 17:
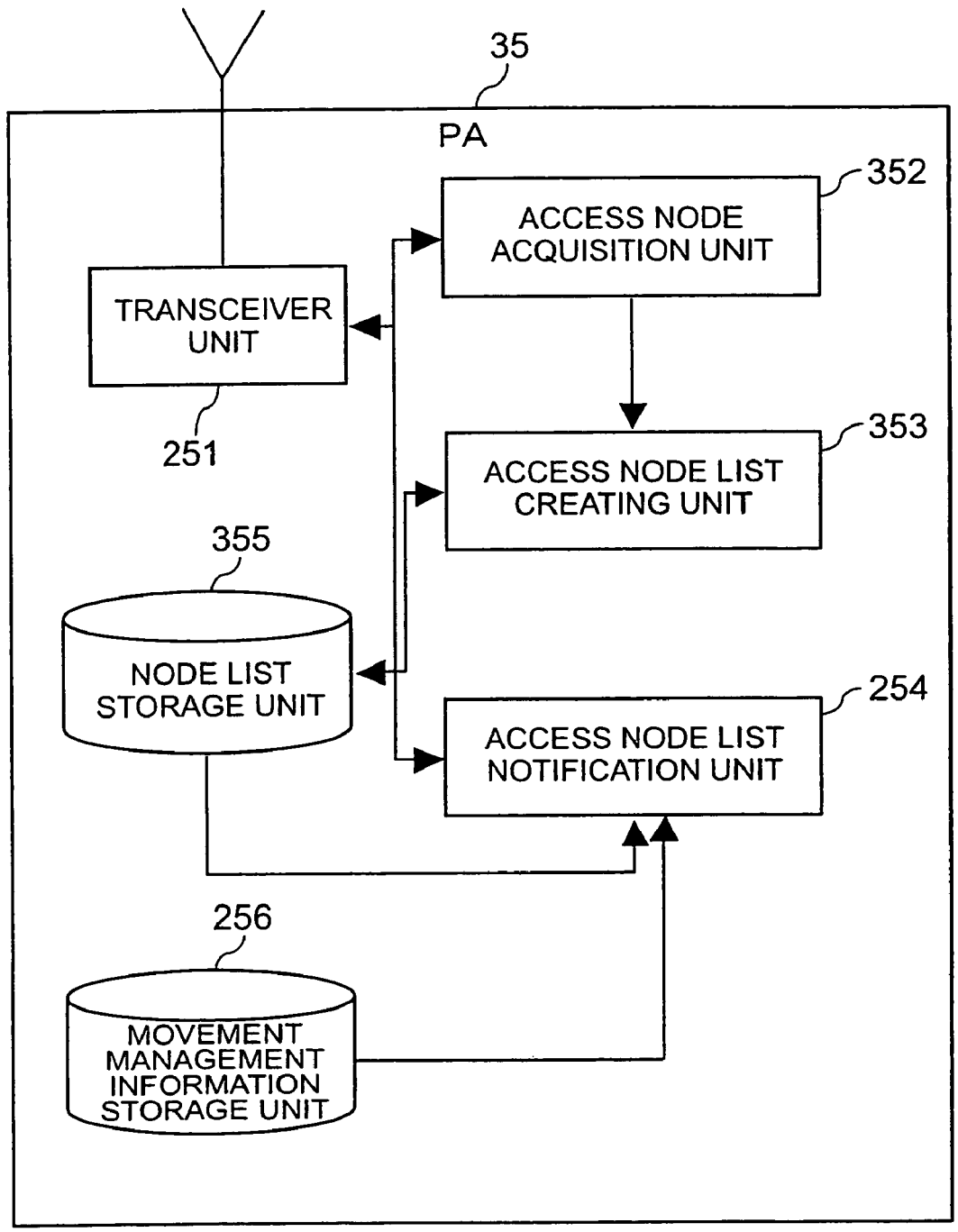
FIG. 17 is a schematic block diagram of the paging agent of FIG. 14.

Next, referring to FIG. 17, the components of the PA35 in the packet communication system 31 will be described.

An access node acquisition unit 352 searches for the IP address of MAPs7 existing in the proximity of the PA35, and transmits, for all the MAPs7 discovered, an access router address requesting packet requesting for transmission of an access node list. The search of the IP address of MAPs7 is performed by transmitting a query packet to the nearest MAP7, which query packet is in turn transferred between MAPs7, and detecting the response packets returned from each MAP7. The access node acquisition unit 352 acquires the access node lists returned from each MAP7 in response to the access router address requesting packet, and outputs them to an access node list creating unit 353.

The access node list creating unit 353 collects the access node lists acquired from a plurality of MAPs7 to create a single access node list, and stores it into a node list storage unit 355. Included in each entry of this access node list are the MAC address of the AP6 on the same link 4 and the IP address of the AR3. The arrangement of the data stored in the node list storage unit 355 is similar to that of the node list storage unit 326(see FIG. 18). The "Sequence" provided here is uniquely determined for each entry of the access node list.

Subsequently, the operation of the packet communication system 31 according to the present embodiment will be described, as well as the movement detection method according to the embodiment of the present invention.

FIG. 19 is a flow chart illustrating the operation of the MH32 in the packet communication system 31. Here, since the processes in steps S407-S411 of FIG. 19 are identical, respectively, to those in steps S208-S212 (see FIG. 12) which have been described in detail for the second embodiment, the processes in steps S401-S406 which are different from the second embodiment will be described below.

First, when transmitting a BU packet to the MAP7, the access node notification unit 221 transmits the IP address of the AR3 on the access link 4 together with the MAC address of the AP6 to the MAP7 (step S401). Subsequently, the access node list requesting unit 222 requests the PA35 for an access node list with regard to the AR3 and the AP6 existing within the paging area in which the MH32 is located, and those existing in the neighboring link (step S402). In response, the access node list acquisition unit 323 receives, from the PA35, a paging request response packet with the access node list option added thereon storing the access node list, and stores it into the node list storage unit 326 (step S403).

Subsequently, the data link layer connection establishment notification unit 202 detects establishment of a connection to the link 4 in the data link layer during a Dormant state and performs a Link up notification to the network layer (step S404). At the same time, the access node address acquisition unit 324 acquires the MAC address of the AP6 on the access link 4 to which a connection is established and notifies it to the network layer (step S405). In response, the network layer movement detection unit 325 determines, based on the MAC address of the AP6 notified from the access node address acquisition unit 324, whether or not the relevant MAC address exists in the access node list by referring to the node list storage unit 326 (step S406).

Next, the operation of the PA35 in the packet communication system 31 will be described, referring to FIG. 20.

Figure 20:
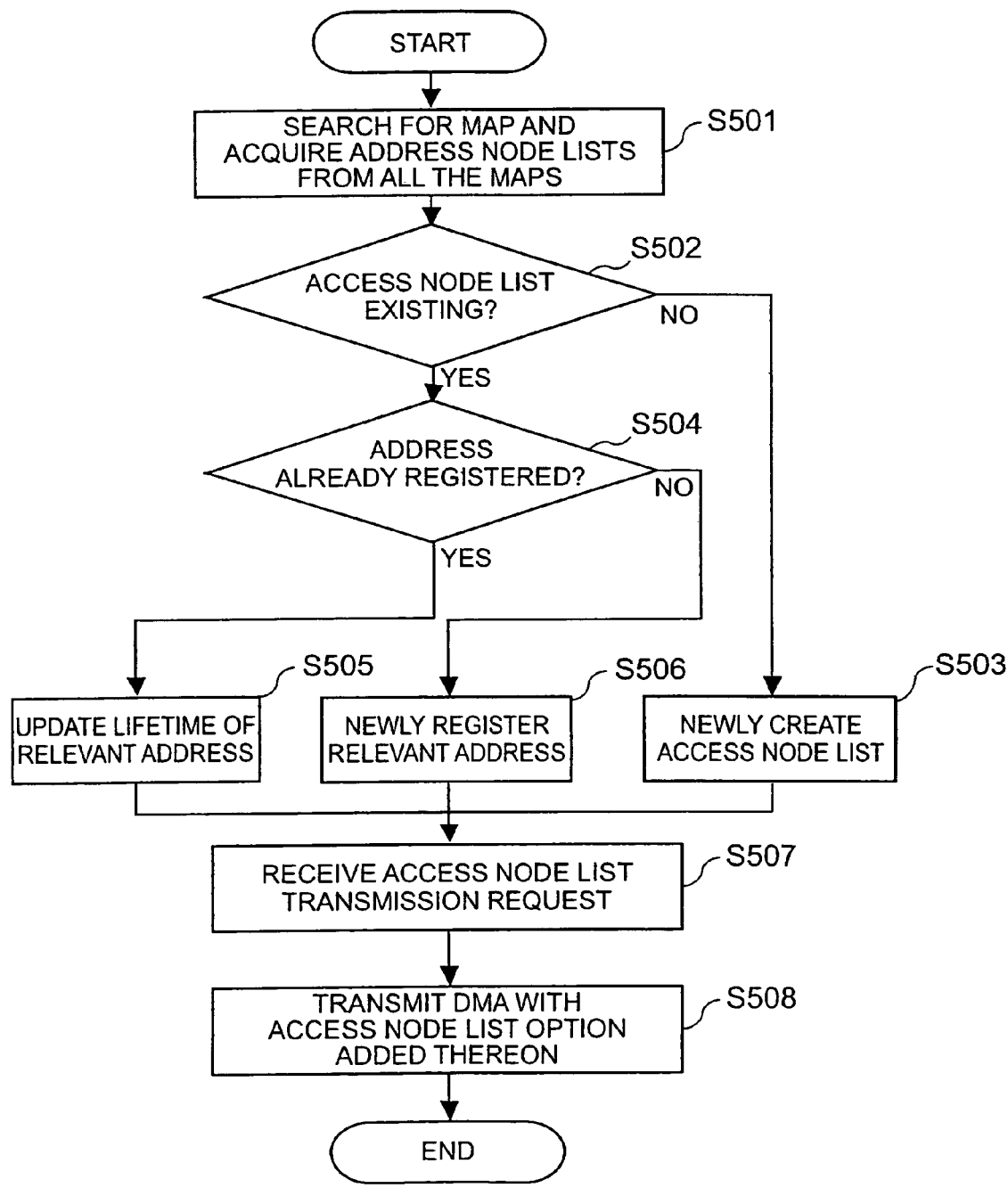
FIG. 20 is a flow chart showing the operation of the paging agent in the packet communication system of FIG. 14.

FIG. 20 is a flow chart illustrating the operation of the PA35 in the packet communication system 31. Here, since the processes in steps S507-S508 of FIG. 20 are identical, respectively, to those in steps S307-S308 (see FIG. 13) which have been described in detail for the second embodiment, the processes in steps S501-S506 which are different from the second embodiment will be described below.

First, the access node acquisition unit 352 searches for the IP address of the MAP7 existing in the proximity of the PA35, transmits an access router address requesting packet to the discovered MAP7, and acquires the IP address of the AR3 and the MAC address of the AP6 as an access node list (step S501). Next, the access node list creating unit 353 determines whether or not an access node list has already been created in the node list storage unit 355 next (step S502). If, according to the result of the determination, an access node list has not been created (step S502; NO), the access node list creating unit 353 collects the access node lists including the IP address of the AR3 and the MAC address of the AP6 acquired from each MAP7, and stores them into the node list storage unit 355 (step S503), then the process proceeds to step S507.

On the other hand, if, according to the result of the determination, an access node list has already been created (step S502;YES), the access node list creating unit 353 determines whether or not the IP address of the AR3 and the MAC address of the AP6 have already been registered in the access node list (step S504). If, according to the result of the determination, the IP address and the MAC address have already been registered in the access node list (step S504; YES), the access node list creating unit 353 updates the lifetime of the relevant address included in the access node list (step S505). If, on the other hand, the IP address and the MAC address have not been registered in the access node list (step S504; NO), the access node list creating unit 353 additionally records the relevant address in the access node list as a new entry (step S506).

Also in the packet communication system 31 described above, the MH32 notifies, by transmitting to MAP7, the information with regard to the address of the AR3 and AP6 existing on the access link 4. In response, the PA35 acquires the information with regard to the address of the AR3 and the AP6 to which the MH32 has been connected in the past to create an address list of the AR3 and the AP6. In addition, the MH32 requests for transmission of the access node list created in the PA35 and, in response to the request, the PA35 extracts from the access node list and notifies the AR3 and the AP6 in the proximity of the access link 4 to which the MH32 is connected. Furthermore, if a link connection establishment is notified from the data link layer to the network layer during a Dormant state in the MH32, the data link layer address of the AP6 on the access link 4 is acquired, and the default router is detected by searching from the access node list for a list with a matching address. In this manner, an address list with regard to the AR3 and the AP6 in the proximity of the access link 4 of the MH32 is provided from the history information of the address of the AR3 and the AP6 to which the MH32 was connected in the past, whereby detection of the default router in the MH32 can be readily performed based on the address list. In addition, movement detection of the mobile host can be efficiently performed because the control packets in the MH32 are reduced when detecting its movement.

The disclosure of Japanese Patent Application No. 2004-124589 filed Apr. 20, 2004 including specification, drawings and claims is incorporated herein by reference in its entirety.

What is claimed is:

1. A mobile host comprising:
    a communication status detection unit configured to detect that a communication status in a network layer is in a Dormant state, said communication status detection unit being further configured to transmit a Dormant state notification to a data link layer connection establishment notification unit;
    the data link layer connection establishment notification unit configured to notify the network layer that a connection to a link in a data link layer has been established, upon receipt of the Dormant state notification from the communication status detection unit that the mobile host is in the Dormant state; and
    a network layer movement detection unit configured to detect a default router, triggered by notification from said data link layer connection establishment notification unit; and
    a router information requesting unit configured to transmit a Router Solicitation which requests transmission of router advertisement information to the access router existing on the access link to which said mobile host is connected, in response to the notification by said data link layer connection establishment notification unit,
    wherein said network layer movement detection unit is configured to detect a default router, based on the router advertisement information returned from said access router, in response to said Router Solicitation.

2. A mobile host comprising:
    an access node notification unit configured to send information with regard to an address of access nodes existing on an access link to which said mobile host is connected, to a paging agent which manages a movement status of said mobile host;
    an access node list requesting unit configured to request said paging agent to transmit an access node list that includes an address list of access nodes existing on a neighboring link of said access link;
    an access node list acquisition unit configured to acquire, from said paging agent, the access node list transmitted in response to the request by said access node list requesting unit;
    an access node address acquisition unit configured to acquire, from a data link layer, a data link layer address with regard to access nodes existing on said access link, triggered by the establishment of a connection to a link in the data link layer; and
    a network layer movement detection unit configured to detect a default router, based on the data link layer address acquired by said access node address acquisition unit and the access node list acquired by said access node list acquisition unit,
    wherein said access node notification unit is further configured to notify said paging agent of a network layer address and the data link layer address with regard to an access router if an access node existing on said access link is composed of an access router, and notifies said paging agent of the network layer address with regard to the access router and the data link layer address with regard to the access point if the access node existing on said access link is composed of an access router and an access point.

3. The mobile host according to claim 2, wherein said access node notification unit is further configured to notify said paging agent of the information with regard to an address of access nodes existing on said access link, if a communication status has changed from an Active state to a Dormant state, or if an access node on a link located outside a paging area is detected during the Dormant state.

4. The mobile host according to claim 2, wherein said access node list requesting unit is further configured to request said paging agent to transmit an access node list with regard to access nodes existing on access nodes existing in a paging area in which said mobile host is currently located and access nodes existing on neighboring links of said paging area.

5. The mobile host according to claim 2, wherein said network layer movement detection unit is further configured to detect the default router from the access node list acquired by said access node list acquisition unit, by searching for an access node that matches the data link layer address acquired by said access node address acquisition unit.

6. A movement detection method for detecting the movement of a mobile host in a packet communication network, comprising:
    detecting a communication status, in which said mobile host detects that the communication status of a network layer is in a Dormant state;
    transmitting a Dormant state notification to a data link layer connection establishment notification unit;
    notifying a data link layer connection establishment, in which said mobile host notifies the network layer that a connection to a link is established upon receipt of the Dormant state notification that the mobile host is in the Dormant state in said detecting the communication status;
    detecting a network layer movement, in which said mobile host, triggered by the notification from said notifying a data link layer connection establishment, detects a default router; and
    transmitting a Router Solicitation which requests transmission of router advertisement information to an access router existing on an access link to which said mobile host is connected, in response to the notification,
    wherein said detecting includes detecting the default router, based on the router advertisement information returned from said access router, in response to said Router Solicitation.

7. A movement detection method for detecting the movement of a mobile host in a packet communication network, comprising:
    notifying an access node, in which said mobile host sends information with regard to an address of access nodes existing on an access link to which said mobile host is connected, to a paging agent which manages a movement status of said mobile host;
    requesting an access node list, in which said mobile host requests said paging agent to transmit an access node list that includes an address list of access nodes existing on a neighboring link of said access link;
    acquiring an access node list, in which said mobile host acquires, from said paging agent, said access node list transmitted in response to the request made in said requesting an access node list;

acquiring an access node address, in which said mobile host acquires from a data link layer, a data link layer address with regard to access nodes existing on said access link, triggered by the establishment of a connection to a link in the data link layer; and detecting a network layer movement, in which said mobile host detects a default router based on the data link layer address acquired in said acquiring an access node address and the access node list acquired in said acquiring an access node list, wherein said notifying includes notifying said paging agent of a network layer address and the data link layer address with regard to an access router if an access node existing on said access link is composed of an access router, and notifying said paging agent of the network layer address with regard to the access router and the data link layer address with regard to an access point if the access node existing on said access link is composed of an access router and an access point.

* * * * *